(12) United States Patent
Zacharias et al.

(10) Patent No.: US 11,825,415 B2
(45) Date of Patent: Nov. 21, 2023

(54) POWER SAVINGS FOR VOICE SERVICES

(71) Applicant: QUALCOMM Incorporated, San Diego, CA (US)

(72) Inventors: Leena Zacharias, San Jose, CA (US); Arnaud Meylan, San Diego, CA (US); Reza Shahidi, San Diego, CA (US); Lan Lan, San Diego, CA (US); Qingxin Chen, San Diego, CA (US); Farrukh Rashid, San Diego, CA (US); Zhibin Dang, San Diego, CA (US); Akshay Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 17/399,290

(22) Filed: Aug. 11, 2021

(65) Prior Publication Data
US 2023/0047375 A1    Feb. 16, 2023

(51) Int. Cl.
| *H04W 72/04* | (2023.01) |
| *H04W 76/28* | (2018.01) |
| *H04W 52/02* | (2009.01) |
| *H04W 72/23* | (2023.01) |
| *H04L 1/1812* | (2023.01) |
| *H04L 1/20* | (2006.01) |

(52) U.S. Cl.
CPC ....... *H04W 52/0232* (2013.01); *H04L 1/1819* (2013.01); *H04L 1/203* (2013.01); *H04W 72/23* (2023.01)

(58) Field of Classification Search
None
See application file for complete search history.

(56) References Cited

U.S. PATENT DOCUMENTS

| 9,374,796 B2 * | 6/2016 | Li | H04W 4/70 |
| 11,425,659 B2 * | 8/2022 | He | H04W 52/0209 |
| 2009/0180427 A1 * | 7/2009 | Kuo | H04L 1/1851 |
| | | | 370/328 |
| 2009/0181670 A1 * | 7/2009 | Tseng | H04W 76/28 |
| | | | 455/434 |
| 2011/0205928 A1 * | 8/2011 | Pelletier | H04W 52/0216 |
| | | | 370/252 |
| 2015/0126206 A1 | 5/2015 | Krishnamurthy et al. | |
| 2017/0134124 A1 * | 5/2017 | Lee | H04W 72/23 |
| 2020/0145922 A1 * | 5/2020 | Agrawal | H04L 1/188 |
| 2021/0258105 A1 * | 8/2021 | Shrestha | H04L 1/1887 |

FOREIGN PATENT DOCUMENTS

WO    2020173915 A1    9/2020

OTHER PUBLICATIONS

International Search Report and Written Opinion—PCT/US2022/073549—ISA/EPO—dated Oct. 28, 2022.

\* cited by examiner

*Primary Examiner* — Sai Aung
(74) *Attorney, Agent, or Firm* — QUALCOMM Incorporated

(57) ABSTRACT

Certain aspects of the present disclosure provide a method for wireless communication by a user equipment (UE). The UE starts a first timer (such as a discontinuous reception (DRX) hybrid automatic repeat request (HARQ) round-trip-time (RTT) timer), after sending an uplink (UL) data transmission to a network entity. The UE then starts a second timer (such as a DRX retransmission timer) when the first timer expires. The UE then determines whether to wake up or sleep for a duration of the second timer based on a prior block error rate (BLER).

29 Claims, 17 Drawing Sheets

| Parameters | Missed HARQ % | Savings % from 1st retx | Savings % from 2nd retx | Overall power savings |
|---|---|---|---|---|
| N_meas = 2, N_save = 2, BLER_threshold = 1%, BLER_measurement window = 640 ms, alpha = 0.5 | 0.63 | 27.19 | 1.03 | 9.86% |
| N_meas = 4, N_save = 4, BLER_threshold = 1%, BLER_measurement window = 640 ms, alpha = 0.5 | 0.18 | 28.58 | 0.76 | 10.24% |

FIG. 10

POWER SAVINGS FOR VOICE SERVICES

BACKGROUND

Field of the Disclosure

Aspects of the present disclosure relate to wireless communications, and more particularly, to techniques for user equipment (UE) power optimization in new radio (NR) applications.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New Radio (NR) (e.g., $5^{th}$ generation (5G)) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved and desirable techniques for user equipment (UE) power optimization in a voice over new radio (VoNR) system.

Certain aspects of the subject matter described in this disclosure can be implemented in a method for wireless communications by a UE. The method generally includes starting a first timer, after sending an uplink (UL) data transmission to a network entity; starting a second timer when the first timer expires; and determining whether to wake up or sleep for a duration of the second timer based on a prior block error rate (BLER).

Certain aspects of the subject matter described in this disclosure can be implemented in an apparatus for wireless communications by a UE. The apparatus generally includes at least one application processor and a memory configured to: start a first timer, after sending an UL data transmission to a network entity; start a second timer when the first timer expires; and determine whether to wake up or sleep for a duration of the second timer based on a prior BLER.

Certain aspects of the subject matter described in this disclosure can be implemented in an apparatus for wireless communications by a UE. The apparatus generally includes means for starting a first timer, after sending an UL data transmission to a network entity; means for starting a second timer when the first timer expires; and means for determining whether to wake up or sleep for a duration of the second timer based on a prior BLER.

Certain aspects of the subject matter described in this disclosure can be implemented in a computer readable medium storing computer executable code thereon for wireless communications by a UE. The computer readable medium generally includes code for starting a first timer, after sending an UL data transmission to a network entity; code for starting a second timer when the first timer expires; and code for determining whether to wake up or sleep for a duration of the second timer based on a prior BLER.

Certain aspects of the subject matter described in this disclosure can be implemented in a method for wireless communications by a UE. The method generally includes receiving a DCI from a network entity; and stopping an inactivity timer, in response to determining that the DCI conveys an UL grant or a DL grant for a voice data packet, or detecting the voice data packet in an UL queue.

Certain aspects of the subject matter described in this disclosure can be implemented in an apparatus for wireless communications by a UE. The apparatus generally includes at least one application processor and a memory configured to: receive a DCI from a network entity; and stop an inactivity timer, in response to determining that the DCI conveys an UL grant or a DL grant for a voice data packet, or detecting the voice data packet in an UL queue.

Certain aspects of the subject matter described in this disclosure can be implemented in an apparatus for wireless communications by a UE. The apparatus generally includes means for receiving a DCI from a network entity; and means for stopping an inactivity timer, in response to determining that the DCI conveys an UL grant or a DL grant for a voice data packet, or detecting the voice data packet in an UL queue.

Certain aspects of the subject matter described in this disclosure can be implemented in a computer readable medium storing computer executable code thereon for wireless communications by a UE. The computer readable medium generally includes code for receiving a DCI from a network entity; and code for stopping an inactivity timer, in response to determining that the DCI conveys an UL grant or a DL grant for a voice data packet, or detecting the voice data packet in an UL queue.

Certain aspects of the subject matter described in this disclosure can be implemented in a method for wireless communications by a UE. The method generally includes determining an awake time for each of a plurality of scheduling request (SR) occasions having different offset values; selecting one of the SR occasions from the plurality of SR occasions having a minimum period of the awake time; and sending an SR in the selected SR occasion.

Certain aspects of the subject matter described in this disclosure can be implemented in an apparatus for wireless communications by a UE. The apparatus generally includes at least one application processor and a memory configured to: determine an awake time for each of a plurality of SR occasions having different offset values; select one of the SR occasions from the plurality of SR occasions having a minimum period of the awake time; and send an SR in the selected SR occasion.

Certain aspects of the subject matter described in this disclosure can be implemented in an apparatus for wireless communications by a UE. The apparatus generally includes means for determining an awake time for each of a plurality of SR occasions having different offset values; means for selecting one of the SR occasions from the plurality of SR occasions having a minimum period of the awake time; and means for sending an SR in the selected SR occasion.

Certain aspects of the subject matter described in this disclosure can be implemented in a computer readable medium storing computer executable code thereon for wireless communications by a UE. The computer readable medium generally includes code for determining an awake time for each of a plurality of SR occasions having different offset values; code for selecting one of the SR occasions from the plurality of SR occasions having a minimum period of the awake time; and code for sending an SR in the selected SR occasion.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

FIG. 10 illustrates example overall power savings and missed HARQs by a UE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
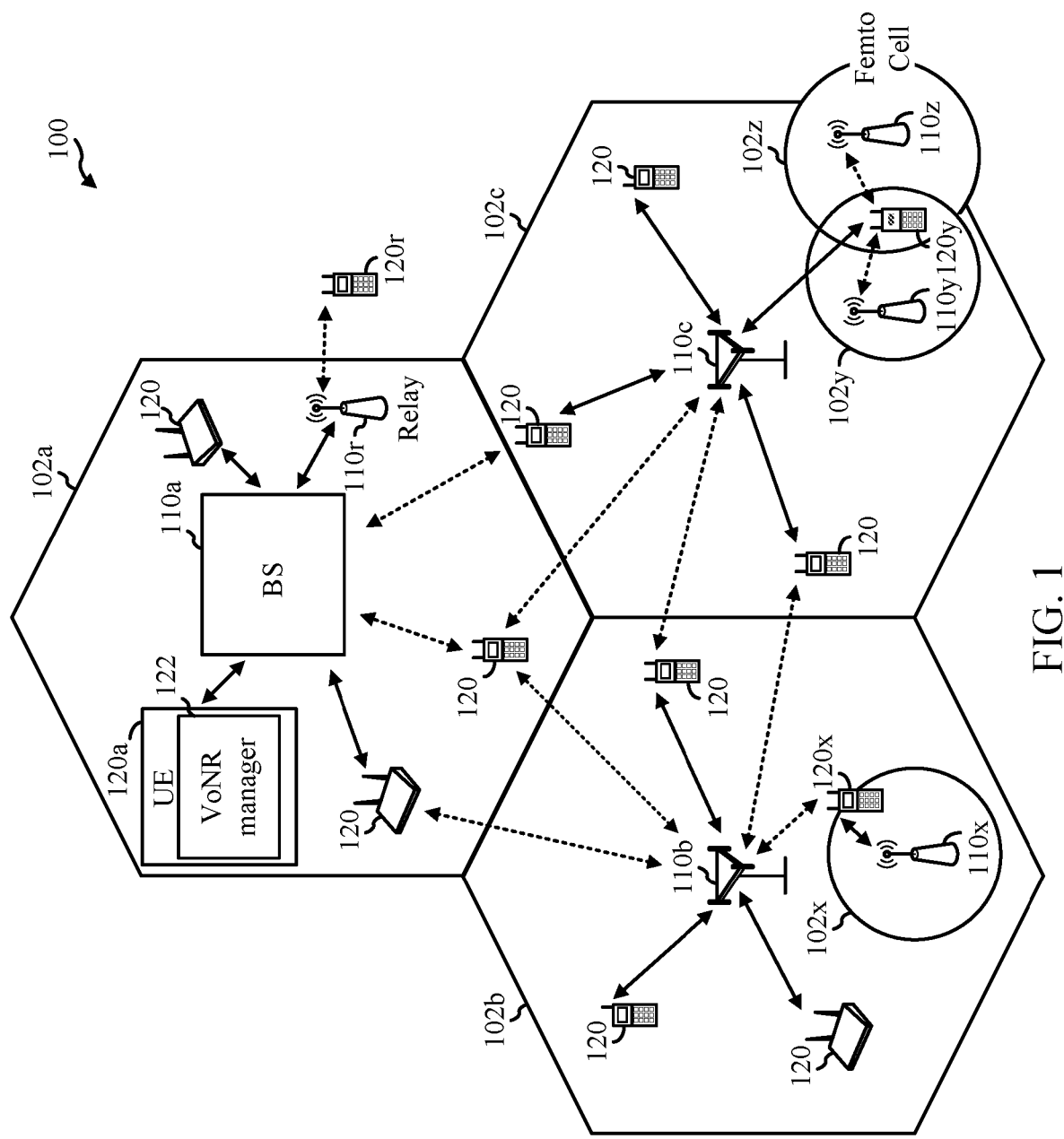
FIG. 1 is a block diagram conceptually illustrating an example wireless communication network, in accordance with certain aspects of the present disclosure.
Figure 1:
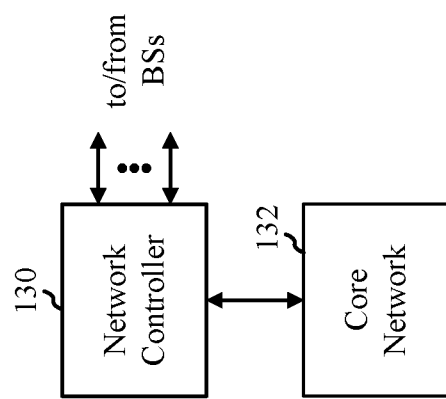

Aspects of the present disclosure provide power optimization techniques that may be used in a voice over new radio (VoNR) system to reduce power consumption of a user equipment (UE). For example, the techniques may help reduce an awake time of the UE.

In one non-limiting example, a UE may implement a first technique to skip hybrid automatic repeat request (HARQ) occasions in order to determine to wake up or sleep during a discontinuous reception (DRX) retransmission timer, based on a past physical uplink shared channel (PUSCH) block error rate (BLER). When the UE may determine to sleep for the duration of the DRX retransmission timer, the UE may save power and skip receiving a HARQ retransmission from a network entity. When the UE implements the first technique for a connected discontinuous reception (CDRX) configured case with voice only traffic, the UE may save 3.4 ms in every CDRX cycle of 10 ms, and therefore achieve 34% power saving.

In another non-limiting example, a UE may implement a second technique to shorten an inactivity timer, for example, to stop an inactivity timer after determining voice only grant. When the UE implements the second technique (in addition to a first technique), the UE may save 4.5 ms in every CDRX cycle of 10 ms, and therefore achieve 45% power saving.

In another non-limiting example, a UE may implement a third technique to select an SR occasion from multiple SR occasions that may have a minimum period of awake time. The UE may then send an SR in the selected SR occasion. Since the UE is awake for a less amount of time based on the selected SR occasion, the UE consumes less power.

The following description provides examples of VoNR power optimization techniques in VoNR operations in wireless communication systems. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with $3^{rd}$ generation (3G), 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, according to certain aspects, the wireless communication network 100 may include base stations (BSs) 110 and/or user equipments (UEs) 120. As shown in FIG. 1, a UE 120a includes a voice over new radio (VoNR) manager 122, which may be configured to perform operations 500 of FIG. 5, operations 1100 of FIG. 11, and/or operations 1300 of FIG. 13.

The wireless communication network 100 may be a NR system (e.g., a $5^{th}$ generation (5G) NR network). As shown in FIG. 1, the wireless communication network 100 may be in communication with a core network. The core network may in communication with BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS 110 may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
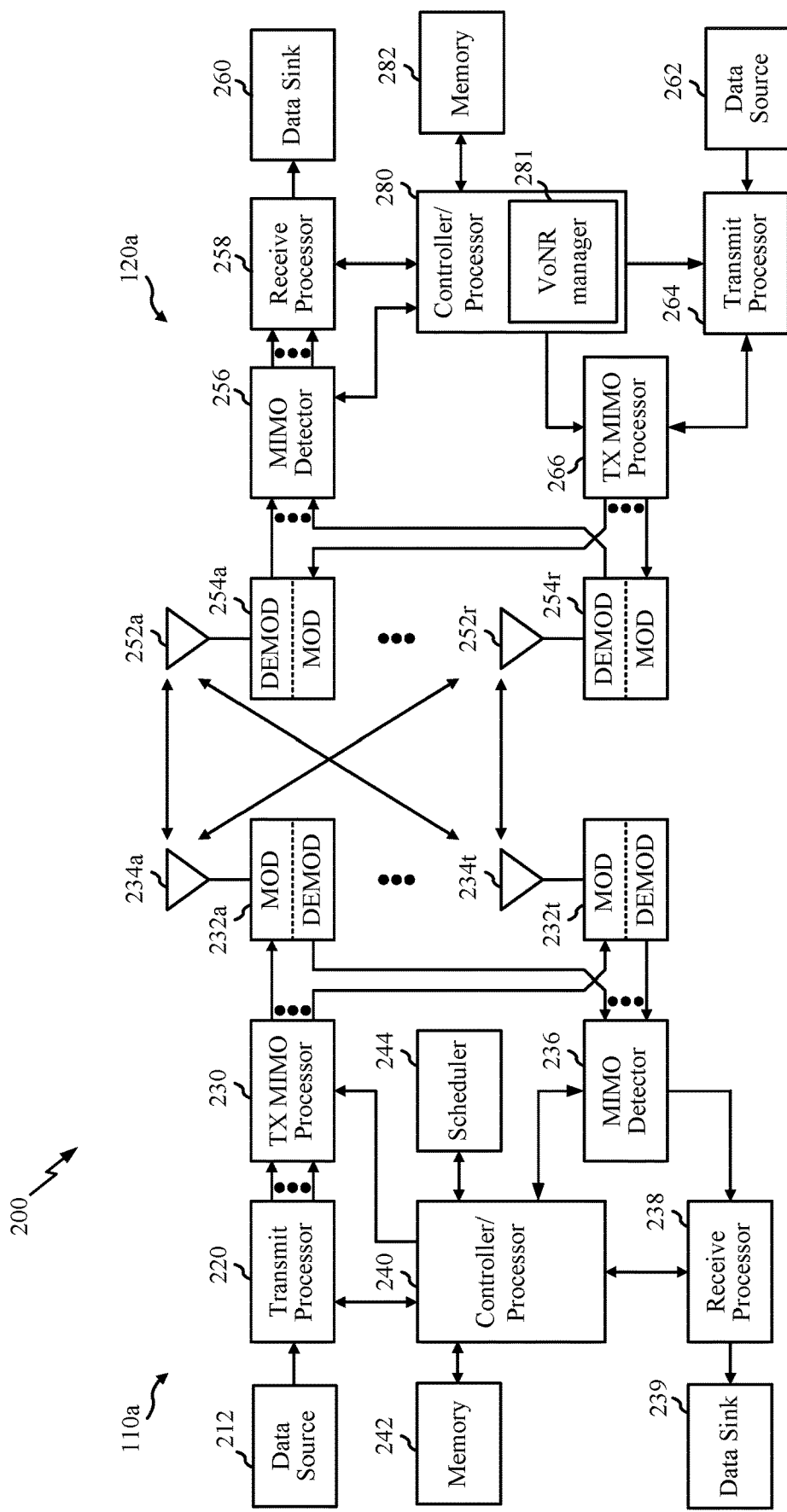
FIG. 2 is a block diagram conceptually illustrating a design of an example base station (BS) and a user equipment (UE), in accordance with certain aspects of the present disclosure.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ (automatic repeat request) indicator channel (PHICH), a physical downlink control channel (PDCCH), a group common PDCCH (GC PDCCH), etc. The data may be for a physical downlink shared channel (PDSCH), etc. A medium access control-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for orthogonal frequency division multiplexing (OFDM), etc.) to obtain an output sample stream. Each MOD in transceivers 232a-232t may further process (e.g., convert to analog, amplify, filter, and upconvert) the output sample stream to obtain a downlink (DL) signal. The DL signals from the MODs in transceivers 232a-232t may be transmitted via antennas 234a-234t, respectively.

At the UE 120a, antennas 252a-252r may receive DL signals from the BS 110a and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On an uplink (UL), at the UE 120a, a transmit processor 264 may receive and process data (e.g., for a PUSCH) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a transmit MIMO processor 266 if applicable, further processed by the MODs in transceivers 254a-254r (e.g., for SC-FDM, etc.), and transmitted to the BS 110a. At the BS 110a, the UL signals from the UE 120a may be received by the antennas 234, processed by the DEMODs in transceivers 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110a and the UE 120a, respectively. A scheduler 244 may schedule the UE 120a for data transmission on a DL and/or an UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 280 of the UE 120a has a VoNR manager 281 that may be configured to perform the operations illustrated in FIG. 5, FIG. 11, FIG. 15, as well as other operations disclosed herein. Although shown at the controller/processor, other components of the UE 120a and the BS 110a may be used to perform the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 3:
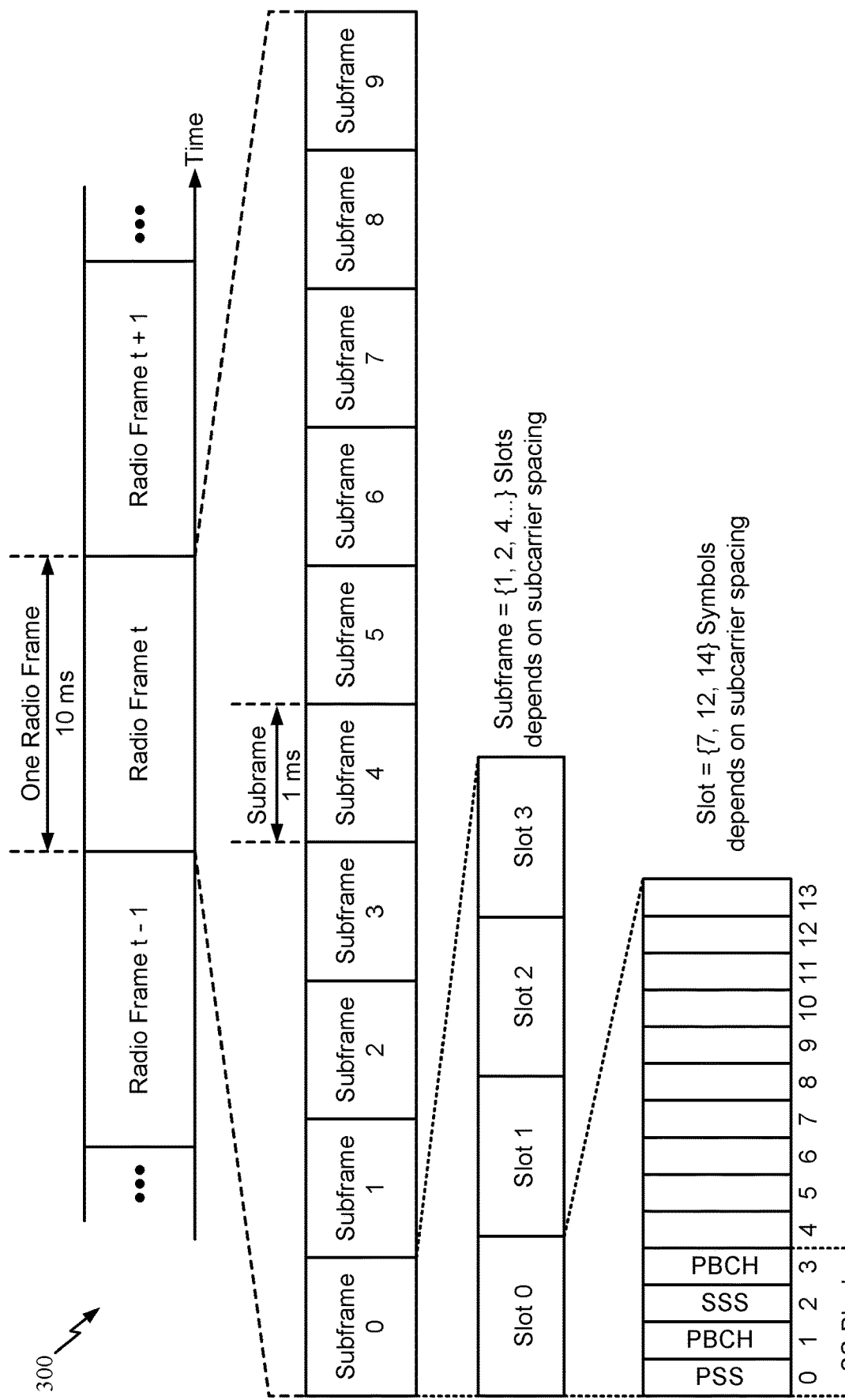
FIG. 3 is an example frame format for certain wireless communication systems (e.g., a new radio (NR)), in accordance with certain aspects of the present disclosure.

FIG. 3 is a diagram showing an example of a frame format 300 for NR. A transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots (e.g., 1, 2, 4, 8, 16, . . . slots) depending on a SCS. Each slot may include a variable number of symbol periods (e.g., 7, 12, or 14 symbols) depending on the SCS. Symbol periods in each slot may be assigned indices. A sub-slot structure may refer to a transmit time interval having a duration less than a slot (e.g., 2, 3, or 4 symbols). Each symbol in a slot may be configured for a link direction (e.g., a DL, an UL, or a flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, a synchronization signal (SS) may provide a CP length and frame timing. The PSS and the SSS may provide cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. The SSBs in an SS burst set may be transmitted in the same frequency region, while the SSBs in different SS bursts sets can be transmitted at different frequency regions.

Example CDRX Operation

Figure 4:
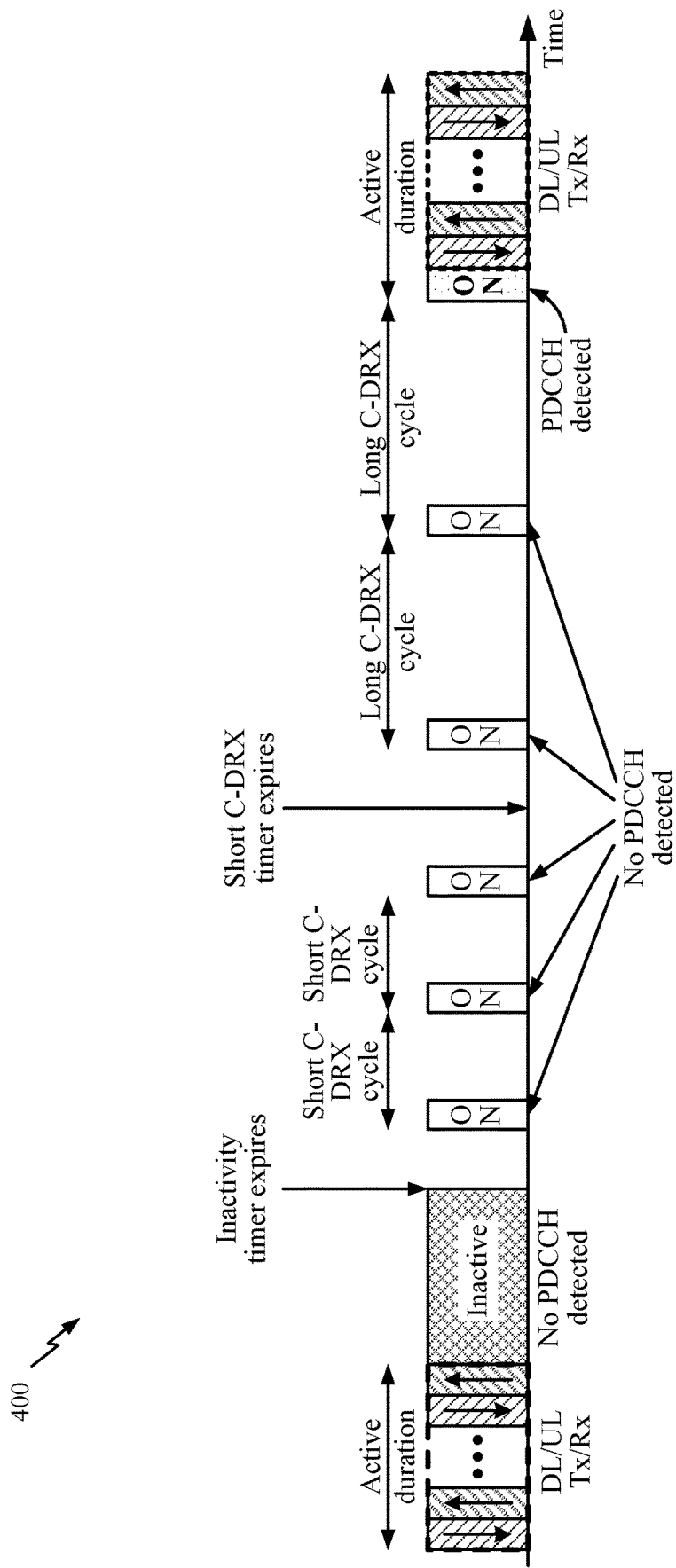
FIG. 4 illustrates connected mode discontinuous reception (CDRX) operations, in accordance with certain aspects of the present disclosure.

As illustrated in an example timing diagram 400 of FIG. 4, during periods of traffic inactivity, a user equipment (UE) switches to a connected discontinuous reception (CDRX) operation for power saving. In the CDRX, when there is no data transmission in either direction (an uplink (UL)/a downlink (DL)) for the UE in a radio resource control (RRC) connected mode, the UE goes into a discontinuous reception (DRX) mode. In the CDRX, the UE monitors a physical downlink control channel (PDCCH) discontinuously. In other words, the UE alternates between sleep (DRX OFF) cycles and active cycles. The CDRX results in power savings because, without the DRX cycles, the UE would needlessly monitor for PDCCH transmissions in every subframe to check if there is DL data available.

The UE is configured for the CDRX according to various configuration parameters, such as an ON duration timer, inactivity timer, a short DRX timer, a short DRX cycle, and a long DRX cycle (which is determined by a network configuration).

As further illustrated in FIG. 4, based on configured parameters, the UE wakes up occasionally for ON durations and monitors for the PDCCH transmissions. Except for the active period durations, the UE remains in a low power (sleep) state referred to as an OFF duration, for the rest of CDRX cycle. During the OFF duration, the UE is not expected to transmit and receive any signal.

The UE wakes up at a termination of a CDRX mode. For example, if the UE detects a PDCCH scheduling data during the ON duration, the UE remains active (e.g., an active time may correspond to an overall awake time of the UE based on all timers such as an inactivity timer and a retransmission timer) to transmit and receive data. Otherwise, the UE goes back to sleep at the end of the ON duration.

Example HARQ Skip Operation

After sending a PUSCH to a network entity (e.g., an eNB/gNB), a UE may start a discontinuous reception (DRX) uplink (UL) hybrid automatic repeat request (HARQ) round-trip-time (RTT) timer. When the DRX HARQ RTT timer expires, the UE may start a DRX UL HARQ retransmission timer. The UE monitors for a scheduling of a HARQ retransmission from the network entity during a duration of the DRX UL HARQ retransmission timer. Also, the longer the UE is awake for this duration (e.g. the duration of the DRX UL HARQ retransmission timer), the more power the UE consumes.

In long term evolution (LTE), a network entity may send a physical hybrid ARQ indicator channel (PHICH) acknowledgment (ACK) to a UE, in response to a PUSCH transmission. The PHICH ACK may ensure that data is kept in the buffer. As long as the data is in the buffer, the UE may remain awake during a duration of a DRX retransmission timer. As noted above, when the UE is awake for more time (e.g., the duration of the DRX retransmission timer), the UE consumes more power.

In $5^{th}$ generation (5G) new radio (NR), for some circumstances, there is no need for a UE to be awake during a duration of a DRX retransmission timer. Since one of the primary challenges in the 5G NR is to reduce power consumption of the UE, due to a limited battery power of the UE, there may be a desire to reduce UE activity (e.g., by decreasing awake time of the UE) when possible.

Aspects of the present disclosure provide apparatuses, methods, processing systems, and computer readable mediums for UE power optimization in a voice over new radio (VoNR).

For example, a UE may implement a first technique (e.g., a HARQ skip technique) to determine to wake up or sleep during a DRX retransmission timer, based on a past PUSCH block error rate (BLER). When the UE determines to sleep for the duration of the DRX retransmission timer based on the past PUSCH BLER, the UE may save power. In some cases, when the UE implements the first technique and sleeps during the duration of the DRX retransmission timer, the UE may save 3.4 ms in every connected discontinuous reception (CDRX) cycle of 10 ms, and hence achieve 34% power saving.

Figure 5:
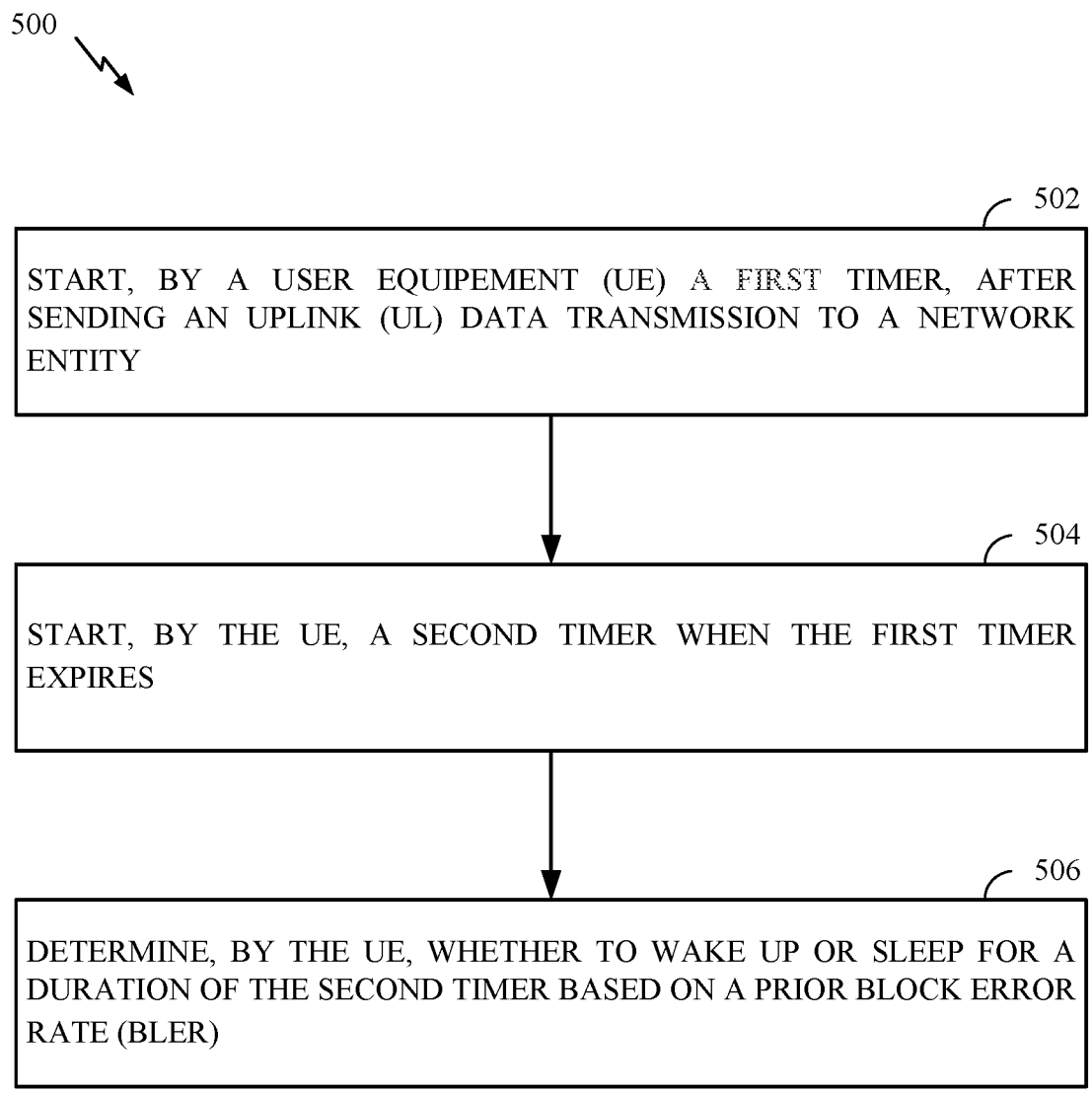
FIG. 5 is a flow diagram illustrating example operations (such as hybrid automatic repeat request (HARQ) skip operations) for wireless communications by a UE, in accordance with certain aspects of the present disclosure.

FIG. 5 is a flow diagram illustrating example operations 500 for wireless communication by a UE, in accordance with certain aspects of the present disclosure. The operations 500 may be performed, for example, by the UE 120a in the wireless communication network 100 of FIG. 1. The operations 500 may be implemented as software components that are executed and run on one or more processors (e.g., the controller/processor 280 of FIG. 2). Further, the transmission and reception of signals by the UE in operations 500 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 500 begin, at 502, by starting a first timer, after sending an uplink (UL) data transmission to a network entity. For example, the UE may start the first timer using a processor of the UE 120*a* shown in FIG. 1 or FIG. 2 and/or of the apparatus shown in FIG. 15. The first timer corresponds to a DRX HARQ RTT timer.

At 504, the UE starts a second timer when the first timer expires. For example, the UE may start the second timer using the processor of the UE 120*a* shown in FIG. 1 or FIG. 2 and/or of the apparatus shown in FIG. 15. The second timer corresponds to a DRX retransmission timer.

At 506, the UE determines whether to wake up or sleep for a duration of the second timer based on a prior BLER. For example, the UE may determine whether to wake up or sleep for the duration of the second timer using the processor of the UE 120*a* shown in FIG. 1 or FIG. 2 and/or of the apparatus shown in FIG. 15.

The operations shown in FIG. 5 may be understood with reference to FIGS. 6-10.

Figure 6:
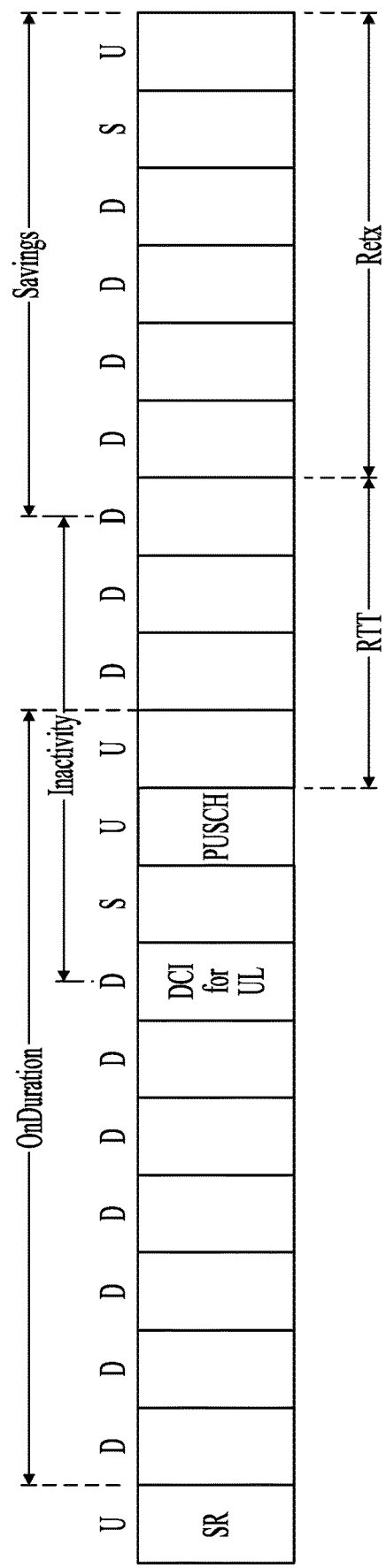
FIG. 6 illustrates example timing operations of a first timer (such as a discontinuous reception (DRX) HARQ round-trip-time (RTT) timer) and a second timer (such as a DRX retransmission timer), in accordance with certain aspects of the present disclosure.

As illustrated in FIG. 6, a UE (e.g., the UE 120*a* shown in FIG. 1 or FIG. 2 implementing a first technique for voice-only traffic) may send a PUSCH transmission to a base station (BS) (e.g., the BS 110*a* shown in FIG. 1 or FIG. 2). The UE then starts a first timer such as a DRX HARQ RTT timer (e.g., a RTT timer). After the DRX HARQ RTT timer expires, the UE starts a second timer such as a DRX retransmission timer (e.g., a Retx timer). The UE may then determine to wake up or sleep during a duration of the DRX retransmission timer based on a past BLER. In one example, the UE may determine to sleep during the duration of the DRX retransmission timer based on the past BLER. This may enable the UE to save power. Also, in some cases, when the UE determines to sleep for the duration of the second timer, the UE may skip receiving one or more HARQ retransmissions from the BS for the duration of the second timer.

In certain aspects, a UE is configured to be awake for a first number of DRX cycles (e.g., N_meas) for all UL retransmissions. In one non-limiting example, the first number of DRX cycles may be equal to 4. During the first number of DRX cycles, the UE measures a BLER (e.g., a PUSCH BLER) after sending all UL data transmissions (e.g., a first data transmission, a second data transmission, etc.) to a BS.

In some cases, the UE may determine the BLER (e.g., BLER_current_after_nth_Tx) being equal to a number of (n+1) th transmission divided by a number of nth transmission. Here, n can be anywhere from 1 to a maximum number of HARQ transmissions (max_HARQ=4) scheduled by the BS.

Figures 7A, 7B:
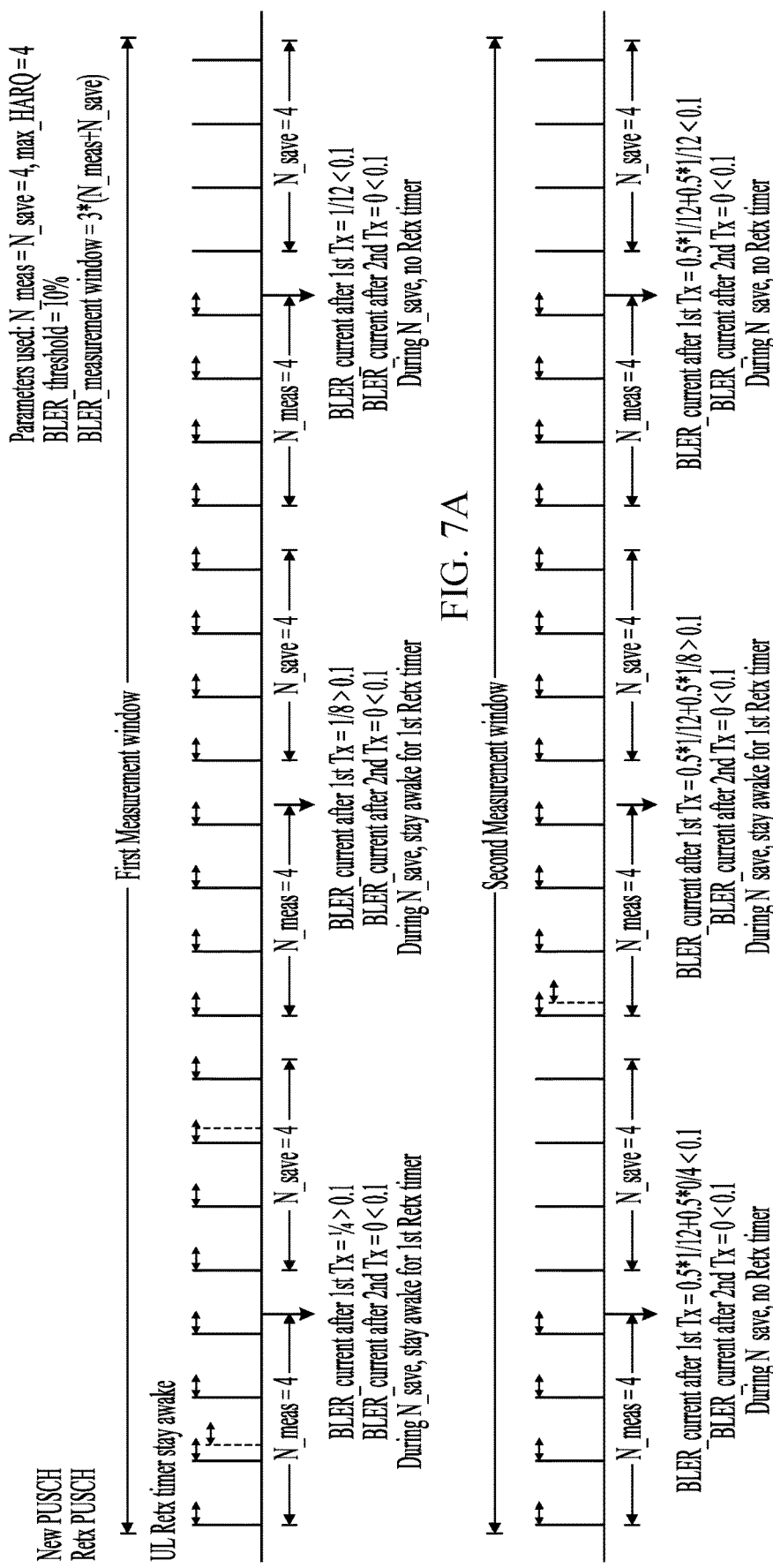
FIG. 7A illustrates example block error rate (BLER) measurement in a first measurement window, in accordance with certain aspects of the present disclosure.
FIG. 7B illustrates example BLER measurement in a second measurement window, in accordance with certain aspects of the present disclosure.

In some cases, the UE may determine an average value of BLERs measured across measurement windows (as illustrated in FIG. 7A and FIG. 7B). In one example, in a measurement window other than a first measurement window, a BLER (e.g., BLER_after_nth_Tx) may be equal to a sum of a first BLER (e.g., BLER_after_nth_Tx*(1-alpha)) and a second BLER (e.g., BLER_current_after_nth_Tx*alpha). In another example, in a first measurement window, a first BLER (e.g., BLER_after_nth_Tx) may be equal to a second BLER (e.g., BLER_current_after_nth_Tx).

In some cases, the UE may reset a number of nth UL transmissions to the BS after every measurement window during which the UE measures the BLER. In some cases, the UE may reset a measured value of a BLER based on a radio resource control (RRC) connection and a cell.

In certain aspects, a UE is configured to not wake up for a second number of DRX cycles (e.g., N_save) for all UL retransmissions. In one non-limiting example, the second number of DRX cycles may be equal to 4. The UE saves power during the duration of the second number of DRX cycles as the UE is sleeping and inactive. In certain aspects, during the second number of DRX cycles, the UE may determine to stay awake for the duration of the second timer after Nth HARQ retransmission, when a prior BLER on the Nth HARQ retransmission is more than or equal to a threshold (e.g., the BLER on nth Tx>BLER_threshold).

In certain aspects, a UE may skip all HARQ retransmissions (N, N+1, N+2, . . . ) if BLER on Nth HARQ retransmission is less than a BLER threshold (e.g., skip all n, n+1, n+2, . . . if BLER on Nth Tx<BLER_threshold).

In certain aspects, a BLER threshold may be changed based on N. Also, for each Nth HARQ transmission, a UE may skip a HARQ transmission when a BLER on Nth HARQ transmission is less than a threshold (e.g., for each HARQ nth Tx, skip if BLER on nth Tx<BLER_threshold_n).

In certain aspects, a UE may measure the BLER as number of N+1 th/number of first HARQ transmission.

In certain aspects, N_meas and N_save may be other timer based instead of an integer number of DRX cycles. In certain aspects, N_meas and N_save may be based on a number of PUSCH samples instead of a constant time. In certain aspects, N_meas and N_save may be dynamically adjusted based on channel and/or traffic conditions.

In certain aspects, during a measurement window (e.g., a first window), BLER metrics may be used only if there are a minimum number of PUSCH samples available. Also, the BLER metrics may be reset if there is period of time when no PUSCH sample is available.

In certain aspects, during each measurement window, a first number of DRX cycles during which a UE measures a BLER is followed after a second number of DRX cycles during which the UE does not wake up, if the measured BLER after Nth UL data transmission is less than a threshold (e.g., BLER_after_nth_Tx is below a threshold for n=1 to max_HARQ).

In certain aspects, during each measurement window, a first number of DRX cycles during which a UE measures a BLER may be followed after the first number of DRX cycles during which the UE measures the BLER, if the measured BLER after Nth UL data transmission is more than a threshold (e.g., all BLER_after_nth_Tx metrics are >threshold for n=1 to max_HARQ).

Figure 8:
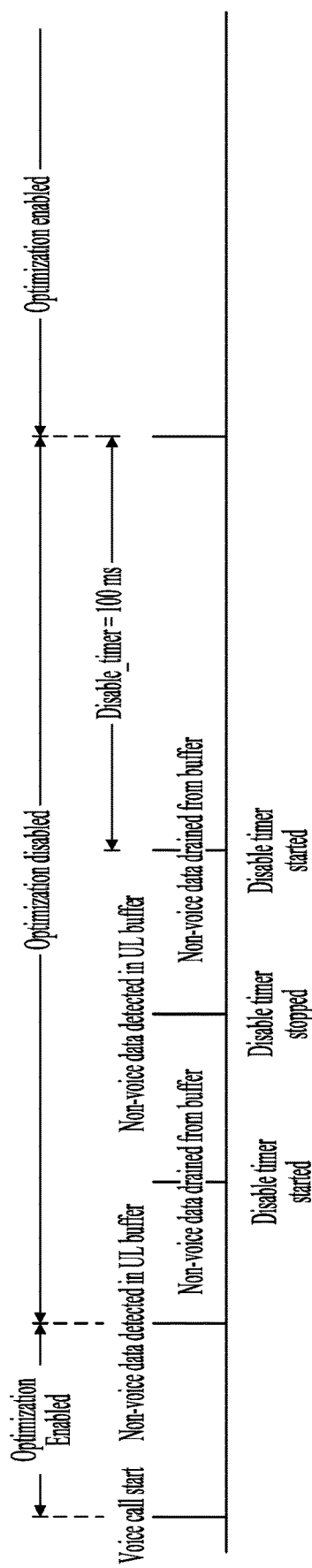
FIG. 8 illustrates example timing operations of a disable timer, in accordance with certain aspects of the present disclosure.

As illustrated in FIG. 8, a UE may receive a voice call. The UE is configured to enable a first technique as a default from a beginning of the voice call (except during a voice hold). When the first technique is enabled, the UE may determine to sleep or wake up during a duration of a second timer based on a past BLER.

In certain aspects, the UE may detect a non-voice data packet in an UL buffer or a downlink (DL) transmission. When the non-voice data packet is detected, the UE is configured to be awake for a duration of a second timer (e.g., a Retx timer). The UE may start a disable timer (e.g., for 100 ms), in response to detecting that the non-voice data packet in the UL buffer is drained. When the non-voice data packet appears again in the UL buffer or DL transmission, the disable timer is stopped and started again once the non-voice data packet in the UL buffer is drained. When the disable timer expires, the UE may again enable the first technique.

In some cases, the UE may disable the first technique on detecting the non-voice data packet because the non-voice data packet may cause DL grants and/or UL grants during the duration of the second timer. This may require the UE to be awake during the duration of the second timer.

In some cases, when the first technique is disabled, the UE does not measure the BLER during the period, since a value of the BLER may be different (e.g., when both a voice data packet and the non-voice data packet are involved). In some cases, the UE may reset the past BLER after the disable timer is expired.

In some cases, the UE may detect the non-voice data packet in the DL and/or the UL, based on all logical channel IDs (LCIDs) other than a LCID of unacknowledged mode (UM) bearer in IP multimedia subsystem (IMS) protocol data unit (PDU) session. In some cases, the UE may detect the non-voice data packet based on data radio bearer (DRB) data that may not be tied to the IMS PDU session (e.g., to avoid signaling radio bearer (SRB)/IMS signaling traffic). In one non-limiting example, when the UE detects the non-voice data packet in a DL transport block, the UE may stop the disable timer. In another non-limiting example, when the UE detects the non-voice data packet in the UL buffer, the UE may stop the disable timer.

In certain aspects, a UE may check for various factors during a first number of DRX cycles and a second number of DRX cycles. Based on these factors, the UE may start a disable timer (i.e., disable N_save/second number of DRX cycles but continue with N_meas/first number of DRX cycles) for a predetermined period (e.g., 1 second). In certain aspects, the UE may stop the disable timer, after the predetermined period, when all BLERs are less than a threshold. The UE may then enable the first number of DRX cycles as well as the second number of DRX cycles.

In one non-limiting example, the UE may determine whether an allocation of a PUSCH modulation coding scheme (MCS) has reduced beyond a threshold (e.g., by >=1) when a path loss of the UE has not changed or remains same (i.e., within a range of 2 dB). When the UE determines that the allocation of the PUSCH MCS has reduced beyond the threshold when the path loss of the UE has not changed, the UE may start the disable timer for the predetermined period.

In another non-limiting example, the UE may determine if there is any evidence of a missed DCI from a BS. In some cases, the UE may determine the evidence of the missed DCI when there is no toggling of a new data indicator (NDI) in an ON duration of a DRX cycle as compared to a previous ON duration of the DRX cycle. This may indicate to the UE that the BS is continuing sending retransmissions since data is not recovered. In some cases, the UE may determine the evidence of the missed DCI when there is the toggling of the NDI in the ON duration of the DRX cycle but the DCI provides a reserved MCS. This may indicate to the UE that the UE missed some new DCI when the UE was in a sleep mode. When the UE may determine the evidence of the missed DCI, the UE may start the disable timer for the predetermined period.

In another non-limiting example, the UE may receive a real time transport protocol (RTP) control protocol (RTCP) feedback indicating a packet loss (i.e., information is needed from an IMS to a MAC). When the UE receives the RTCP feedback indicating the packet loss, the UE may start the disable timer for the predetermined period.

In another non-limiting example, the UE may receive a robust header compression (ROHC) feedback indicating the packet loss (i.e., information is needed from PDCP). When the UE receives the ROHC feedback indicating the packet loss, the UE may start the disable timer for the predetermined period.

In certain aspects, a UE may determine to sleep for a duration of a second timer, based on a prior BLER, only when a duration of the second timer is more than or equal to a predetermined time period (e.g., 3 ms). When the UE sleeps for the duration of the second timer, the UE may have 2.3% battery power savings for 3 ms overall time saved (i.e., sleep time).

In certain aspects, a UE may determine to wake up for a first duration during a duration of a second timer, based on a prior measurement of a HARQ retransmission delay. A value of the first duration may be less than a value of the second timer configured by the BS.

Figure 9:
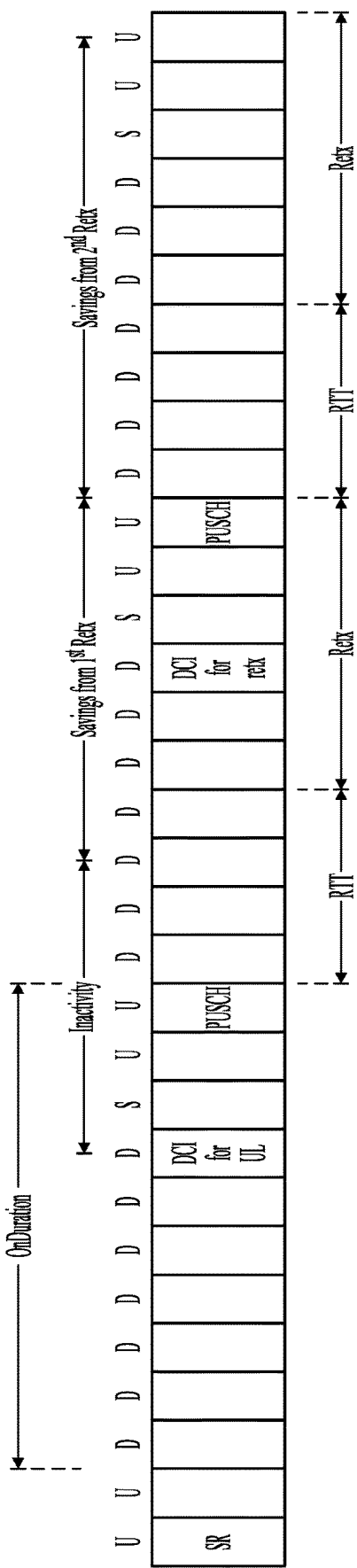
FIG. 9 illustrates example timing operations of multiple DRX HARQ RTT timers and multiple DRX retransmission timers, in accordance with certain aspects of the present disclosure.

As illustrated in FIG. 9, when a UE may determine to sleep during a duration of a second timer based on a past BLER, the UE may save power. For example, the UE may save approximately 35% power (i.e., 3.9 ms saved per DRX cycle of 11 ms) from a first HARQ retransmission, 31% power (i.e., 5 ms saved per DRX cycle of 16 ms) from a second HARQ retransmission, 24% power from a third HARQ retransmission, 19% power from a fourth HARQ retransmission, 16% power from a HARQ fifth retransmission, and so on.

As illustrated in FIG. 10, a VoNR log shows overall power savings and missed HARQs by a UE (e.g., when the UE may determine to sleep during a duration of a second timer based on a past BLER). The overall power savings from nth HARQ retransmission may be measured as a percentage of PUSCHs where there was no nth HARQ retransmission and the UE correctly went to sleep during the duration of the second timer. The missed HARQs may be measured as a percentage of PUSCHs where there were some HARQ retransmissions, but the UE went to sleep and missed these HARQ retransmissions.

Example Inactivity Timer Shortening Operation

In some cases, a UE may restart an inactivity timer every time a new downlink control information (DCI) is received from a network entity. This may increase active duration for the UE in a connected discontinuous reception (CDRX) cycle. The restarting of the inactivity timer is intended for internet traffic where one set of data in a downlink (DL)/uplink (UL) is triggered by another set of data. The restarting of the inactivity timer may allow a subsequent set of data to be scheduled immediately rather than waiting for a next active duration of the CDRX cycle.

However, there may not be as much of a need for the restarting of the inactivity timer for voice data. This is because one set of voice data is not triggered based on some another set of voice data, and there is usually a fixed interval between two voice data packets. Since one of the primary challenges in 5$^{th}$ generation (5G) new radio (NR) is to reduce power consumption of the UE, due to a limited battery power of the UE, there is a need to reduce UE activity (e.g., by reducing the active duration of the CDRX cycle for the UE) when possible.

Aspects of the present disclosure provide apparatuses, methods, processing systems, and computer readable mediums for stopping an inactivity timer in certain circumstances (e.g., during voice over new radio (VoNR) operations). This may result in power saving for a UE as there will be a smaller active duration of a CDRX cycle.

For example, a UE may implement a second technique (e.g., an inactivity timer shortening technique) to stop an inactivity timer after determining voice only grant. In some cases, when the UE assumes that an UL transport block (TB) information in known in a same slot where a DCI arrives from a network entity (since a physical uplink shared channel (PUSCH) has to be scheduled one or more slots ahead), and a DRX retransmission timer is stopped along with the inactivity timer, the UE may save 4.5 ms in every CDRX cycle of 10 ms, and hence achieve 45% power saving.

Figure 11:
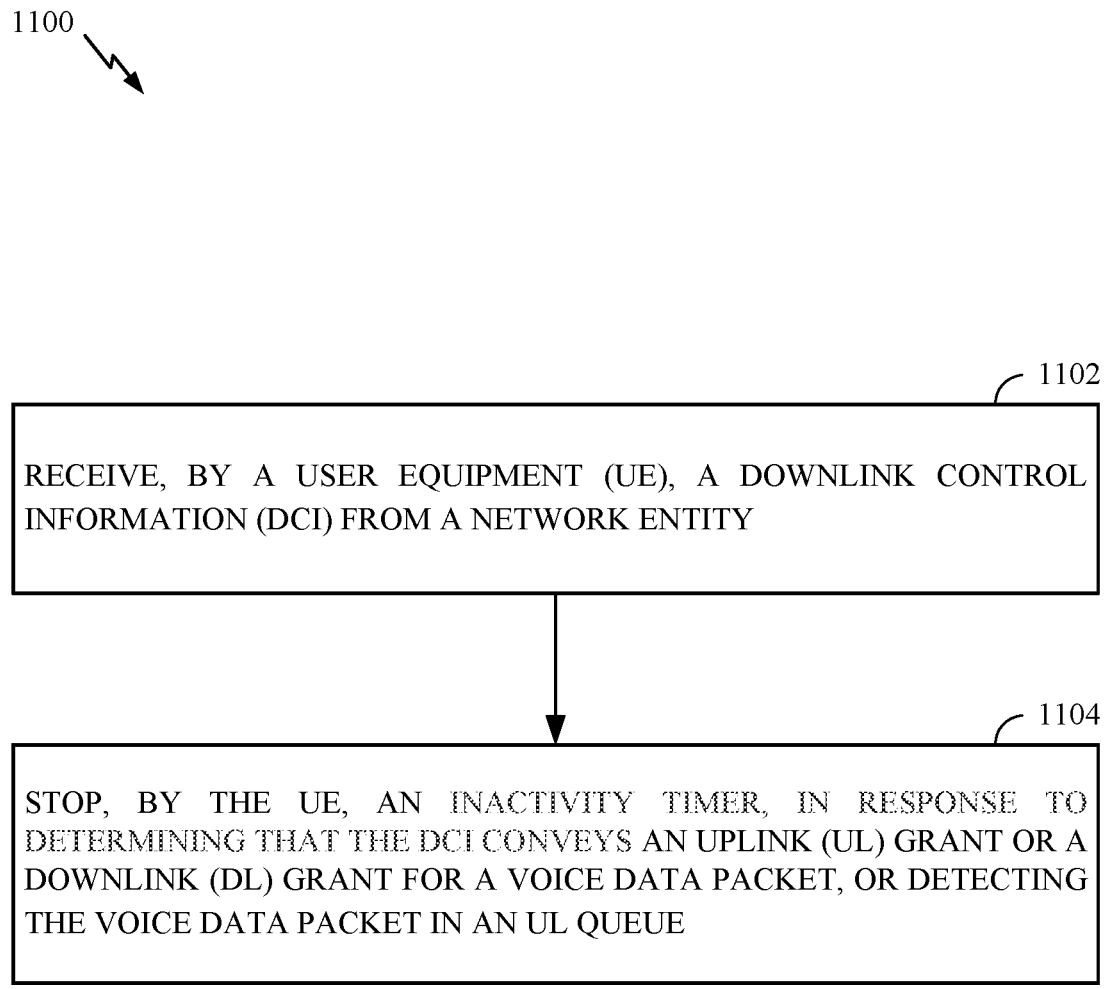
FIG. 11 is a flow diagram illustrating example operations (such as inactivity timer shortening operations) for wireless communications by a UE, in accordance with certain aspects of the present disclosure.

FIG. 11 is a flow diagram illustrating example operations 1100 for wireless communication by a UE, in accordance with certain aspects of the present disclosure. The operations 1100 may be performed, for example, by the UE 120a in the wireless communication network 100 of FIG. 1 of FIG. 2. The operations 1100 may be implemented as software components that are executed and run on one or more processors (e.g., the controller/processor 280 of FIG. 2). Further, the transmission and reception of signals by the UE in operations 1100 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 1100 begin, at 1102, by receiving a DCI from a network entity. For example, the UE may receive the DCI using antenna(s) and receiver/transceiver components of the UE 120a shown in FIG. 1 or FIG. 2 and/or of the apparatus shown in FIG. 16.

At 1104, the UE stops an inactivity timer, in response to determining that the DCI conveys an UL grant or a DL grant for a voice data packet, or detecting the voice data packet in an UL queue. For example, the UE may stop the inactivity timer using a processor of the UE 120a shown in FIG. 1 or FIG. 2 and/or of the apparatus shown in FIG. 16.

Figure 12:
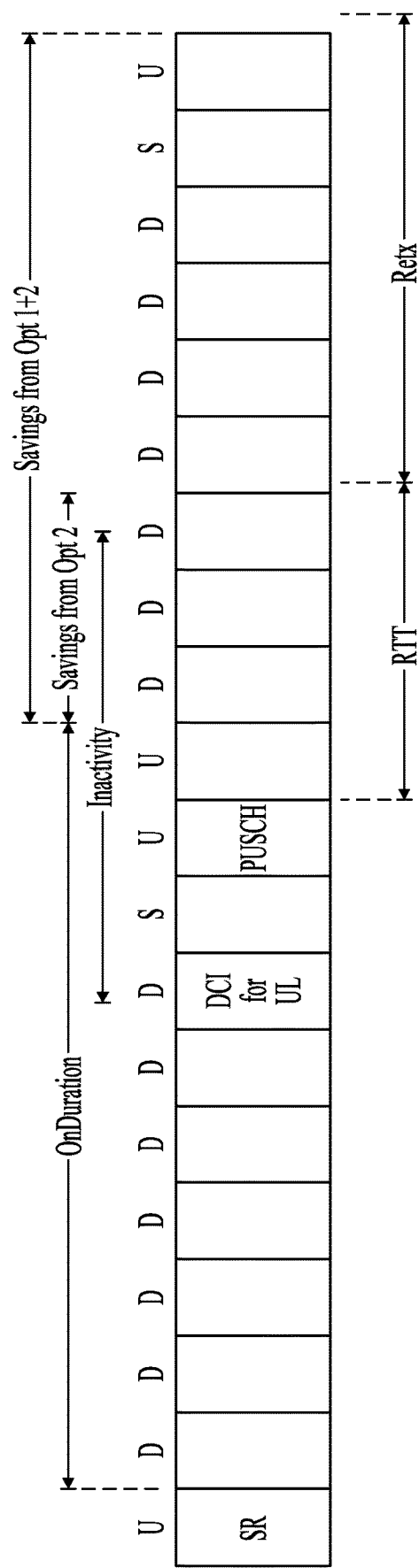
FIG. 12 illustrates example timing operations of an inactivity timer, in accordance with certain aspects of the present disclosure.

The operations shown in FIG. 11 may be understood with reference to FIG. 12.

As illustrated in FIG. 12, a BS (e.g., the BS 110a shown in FIG. 1 or FIG. 2) sends a DCI to a UE (e.g., the UE 120a shown in FIG. 1 or FIG. 2 implementing a second technique for voice-only traffic). When the DCI conveys an UL grant or a DL grant for a voice data packet, or the UE detects the voice data packet in an UL queue, the UE stops the inactivity timer (incase the inactivity timer was started earlier by another DCI indicating a non-voice data packet). In certain aspects, if a prior DCI contained only the voice data packet, then the inactivity timer was never started.

In certain aspects, a UE may disable a second technique (e.g., for T_disable) when the UE identifies a non-voice data packet in a DL or detects the non-voice data packet in an UL queue. In one non-limiting example, when the UE detects an UL grant or a DL grant containing the non-voice data packet, the UE starts a disable timer. In another non-limiting example, when the UE detects the non-voice data packet in the UL queue, the UE starts the disable timer. In certain aspects, when the disable timer starts, the UE is configured to be awake for a duration of the inactivity timer, which increases active duration of a CDRX cycle.

In certain aspects, a UE may disable a second technique for a current DRX cycle. For example, the UE starts a disable timer for the current DRX cycle when an UL buffer status report (BSR) is indicated in an UL transport block (TB). The UE is configured to be awake for a duration of an inactivity timer when the disable timer starts.

In certain aspects, a UE detects a voice data packet (e.g., when a transport block (TB) may only include voice bearer traffic and no data traffic) in a DL and an UL, based on a logical channel ID (LCID) of unacknowledged mode (UM) bearer in IP multimedia subsystem (IMS) protocol data unit (PDU) session. In one example, when the UE detects the voice data packet in a DL transport block, the UE stops the inactivity timer. In another example, when UL transport block includes only voice data packets or padding (to account for static grants), the UE stops the inactivity timer.

In certain aspects, when an inactivity timer is stopped during a voice call, a UE may skip receiving RRC signaling. For example, the RRC may be triggered by an UL (e.g., a measurement report) and identified from an UL TB. Although a RRC reconfiguration is unlikely in a middle of the voice call, however, in some cases, there may be an UL configured grant (CG) configuration after the voice call starts. Accordingly, to avoid missing any signaling, after the voice call set up, the UE enables a second technique after a predetermined time period (e.g., T_setup_wait).

Example Mailbox SR Selection Operation

In some cases, a UE may select a scheduling request (SR) occasion from multiple SR occasions, and then send an SR in the selected SR occasion to a network entity.

The UE implements a selection method to select the SR occasion from the multiple SR occasions. Based on the selection method, if there is an SR occasion (e.g., a physical uplink control channel (PUCCH) resource) slightly ahead of a start of a connected discontinuous reception (CDRX) cycle (i.e., less than or equal to TH_OFF (e.g., 5 ms)), then the UE selects this SR occasion. If there is an SR occasion during an ON duration of the CDRX cycle (and there is no SR occasion that is slightly ahead of the start of the CDRX cycle), then the UE selects this SR occasion. However, if there is no SR occasion that is slightly ahead of the CDRX cycle or during the active duration of the CDRX cycle, then the UE selects whatever SR occasion is available (e.g., an SR occasion that is much ahead of the start of the CDRX cycle).

There are several potential problems associated with the existing selection method for selecting the SR occasion from the multiple SR occasions. For example, the existing selection method performs a heuristic selection of the SR occasion, and the SR occasion selected using this selection method may not reduce an overall awake time of the UE. For example, in some cases, based on this selection method, the UE may select the SR occasion that is much ahead of the start of the CDRX cycle, and then send an SR in this SR occasion. The UE then has to stay awake (in addition to the active duration of the CDRX cycle) from the time of sending this SR to receiving a grant from the network entity. When the UE is awake for more time, it results in more power consumption by the UE.

The existing selection method may work for time division duplex (TDD) communications (e.g., where a discontinuous reception (DRX) cycle starts in a downlink (DL) slot and an uplink (UL) slot is just before the DL slot, so there may be no UL slots until an end of ON duration of the DRX cycle). In TDD communication cases, there may be only one SR occasion that is slightly ahead of a start of a CDRX cycle (as there may not be enough time to send a SR and then receive a downlink control information (DCI)). In such cases, the UE may not be awake for more time based on the SR occasion.

However, in some cases, such as in frequency division duplex (FDD) communications, there may be multiple SR occasions such as a first SR occasion that is slight ahead of the start of the CDRX cycle and a second SR occasion that is within the ON duration of the CDRX cycle. Based on the existing selection method, the UE will select the first SR occasion (as it is slightly ahead of the start of the CDRX cycle). However, it may be possible that the second SR occasion rather than the first SR occasion reduces the awake time of the UE. Accordingly, by selecting the first SR occasion using the existing selection method, the UE may not reduce its overall awake time and power consumption.

Aspects of the present disclosure provide apparatuses, methods, processing systems, and computer readable mediums for selecting an SR occasion based on a total awake time in certain circumstances (e.g., during voice over new radio (VoNR) operations).

For example, a UE may implement a third technique to select an SR occasion from multiple SR occasions that may have a minimum period of awake time. Since the UE is awake for a less amount of time based on the selected SR occasion, the UE consumes less power.

Figure 13:
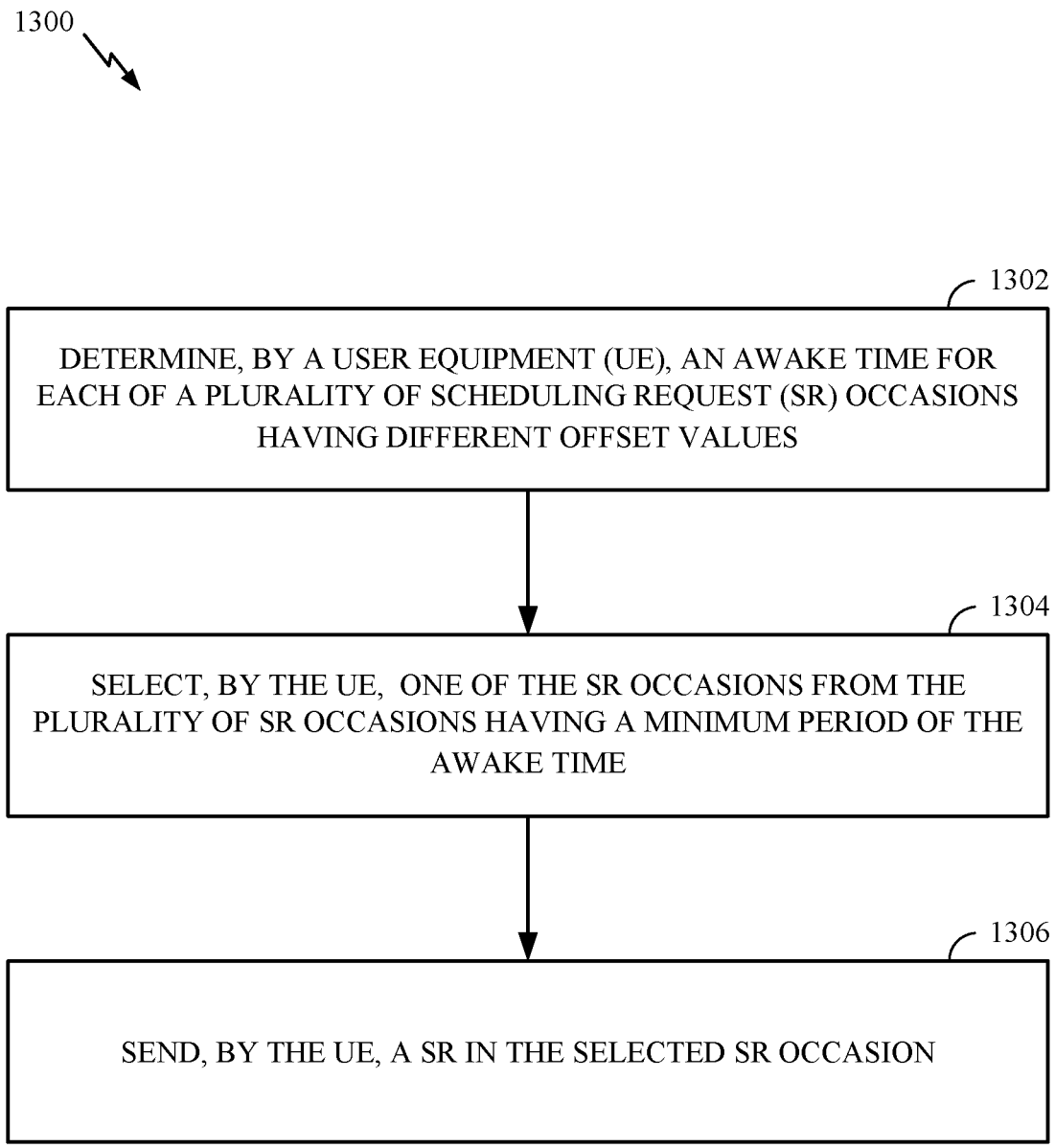
FIG. 13 is a flow diagram illustrating example operations (such as mailbox scheduling request (SR) selection operations) for wireless communications by a UE, in accordance with certain aspects of the present disclosure.

FIG. 13 is a flow diagram illustrating example operations 1300 for wireless communication by a UE, in accordance with certain aspects of the present disclosure. The operations 1300 may be performed, for example, by the UE 120a in the wireless communication network 100 of FIG. 1. The operations 1300 may be implemented as software components that are executed and run on one or more processors (e.g., the controller/processor 280 of FIG. 2). Further, the transmission and reception of signals by the UE in operations 1300 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 1300 begin, at 1302, by determining an awake time for each of a plurality of SR occasions having different offset values. For example, the UE may determine the awake time for each of the plurality of SR occasions using a processor of the UE 120a shown in FIG. 1 or FIG. 2 and/or of the apparatus shown in FIG. 17.

At 1304, the UE selects one of the SR occasions from the plurality of SRs occasions having a minimum period of the awake time. For example, the UE may select one of the SR occasions from the plurality of SRs occasions using the processor of the UE 120a shown in FIG. 1 or FIG. 2 and/or of the apparatus shown in FIG. 17.

At 1306, the UE sends an SR in the selected SR occasion. For example, the UE may send the SR in the selected SR occasion using antenna(s) and transmitter/transceiver components of the UE 120a shown in FIG. 1 or FIG. 2 and/or of the apparatus shown in FIG. 17.

Figure 14:
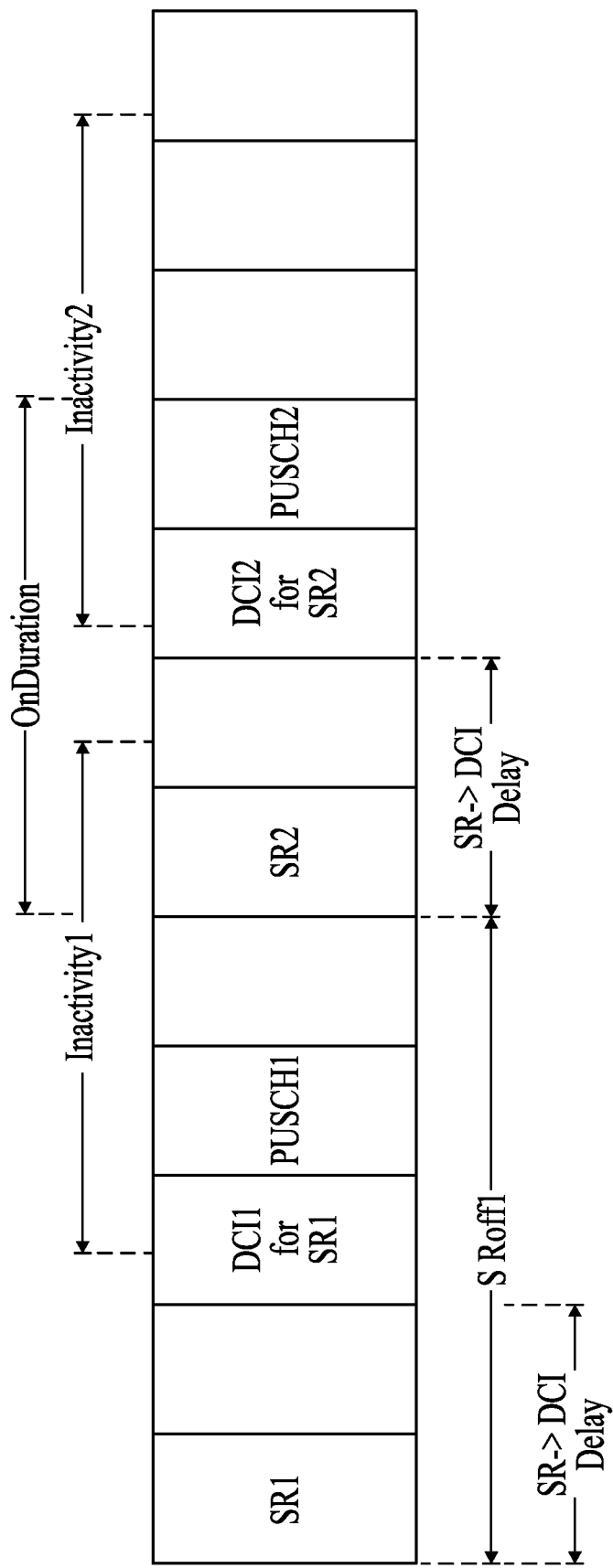
FIG. 14 illustrates example SR occasions, in accordance with certain aspects of the present disclosure.

The operations shown in FIG. 13 may be understood with reference to FIG. 14.

As illustrated in FIG. 14, a plurality of SR occasions includes a first SR occasion (e.g., SR1) and a second SR occasion (e.g., SR2). The first SR occasion may have a first offset value (e.g., SRoff1) occurring before a DRX cycle. The second SR occasion may have a second offset value (e.g., SRoff2) occurring within a DRX cycle. The first offset value and the second offset value are non-negative values containing an offset with respect to a start of ON duration of the DRX cycle (e.g., OnD). To minimize awake time of the UE, a UE (e.g., the UE 120a shown in FIG. 1 or FIG. 2 implementing a third technique for voice-only traffic) selects an SR occasion (from the first SR occasion and the second SR occasion) that minimizes the awake time of the UE.

In certain aspects, a UE may determine an awake time for a first SR occasion based on a maximum of a first value and a second value (i.e., a maximum of (SRoff1+OnD, SR→DCI delay+DCI+InA)). The first value may include a sum of a first offset value and an ON duration of a DRX cycle (i.e., SRoff1+OnD). The second value may include the sum of a duration between the first SR occasion and a receipt of a grant of a DCI, a duration for receiving the DCI, and a duration of an inactivity timer started after receiving the DCI (i.e., SR→DCI delay+DCI+InA).

In some cases, the UE may use the first offset value to determine the awake time for the first SR occasion when a specification definition of the awake time is followed.

In some cases, the UE may ignore a DRX retransmission timer during the voice-only traffic (based on a first technique). In other cases, the awake time for the first SR occasion is the sum of the duration between the first SR occasion and the receipt of the grant of the DCI, the duration for receiving the DCI, K2 (delay until PUSCH), a transmission of the PUSCH, a duration of a DRX hybrid automatic repeat request (HARD) round-trip-time (RTT) timer, and a duration of the DRX retransmission timer (i.e., SR→DCI delay+DCI+K2+PUSCH+RTT+Retx).

In some cases, the UE may determine the awake time for the first SR occasion based on a maximum of the first value, the second value, and an additional value (that may be determined based on the DRX retransmission timer when the UE stays awake during a duration of the DRX retransmission timer).

In certain aspects, a UE may determine an awake time for a second SR occasion based on a maximum of a third value and a fourth value (i.e., a maximum of (OnD, SRoff2+ SR→DCI delay+DCI+InA)). The third value may include an ON duration of a DRX cycle i.e., OnD). The fourth value may include a sum of a second offset value, a duration between the second SR occasion and the receipt of the grant of a DCI, a duration for receiving the DCI, and a duration of an inactivity timer started after receiving the DCI (i.e., SRoff2+SR→DCI delay+DCI+InA).

In one non-limiting example, a first offset value may be 5 ms, a second offset value may be 0, a duration between an SR occasion and a receipt of a grant of a DCI may be 2 ms, a duration for receiving the DCI may be 0.2 ms, an ON duration of the DRX cycle may be 4 ms, and a duration of an inactivity timer started after receiving the DCI may be 4 ms. Accordingly, the first value is 9 ms, the second value is 6.2 ms, the third value is 4 ms, and the fourth value is 6.2 ms. Based on these values, a UE determines an awake time for a first SR occasion as 9 ms (i.e., maximum of (9, 6.2) and for a second SR occasion as 6.2 ms (i.e., maximum of (4, 6.2). The UE then selects the second SR occasion (occurring within a DRX cycle) for sending an SR as there will be less awake time of the UE (i.e., 31% power savings).

In another non-limiting example, a first offset value may be 2 ms, a second offset value may be 1 ms, a duration between an SR occasion and a receipt of a grant of a DCI may be 2 ms, a duration for receiving the DCI may be 0.2 ms, an ON duration of the DRX cycle may be 8 ms, and a duration of an inactivity timer started after receiving the DCI may be 10 ms. Accordingly, the first value is 10 ms, the second value is 12.2 ms, the third value is 8 ms, and the fourth value is 13.2 ms. Based on these values, a UE determines an awake time for a first SR occasion as 12. 2 ms (i.e., maximum of (10, 12.2) and for a second SR occasion as 13.2 ms (i.e., maximum of (8, 13.2). The UE then selects the first SR occasion (occurring before a DRX cycle) for sending an SR as there will be less awake time of the UE.

In certain aspects, a UE may select a first SR occasion from multiple SR occasions including the first SR occasion and a second SR occasion only when a maximum of a first value and a second value is less than a maximum of a third value and a fourth value (i.e., a maximum of (SRoff1+OnD, SR→DCI delay+DCI+InA)<max (OnD, SRoff2+SR→DCI delay+DCI+InA)).

In certain aspects, a UE may determine a duration between an SR occasion and a receipt of a grant of a DCI (i.e., an average duration between a time of transmission of an SR and a time until the DCI is received based on the SR transmission) based on one or more past SR occasions.

Example Wireless Communication Devices

Figure 15:
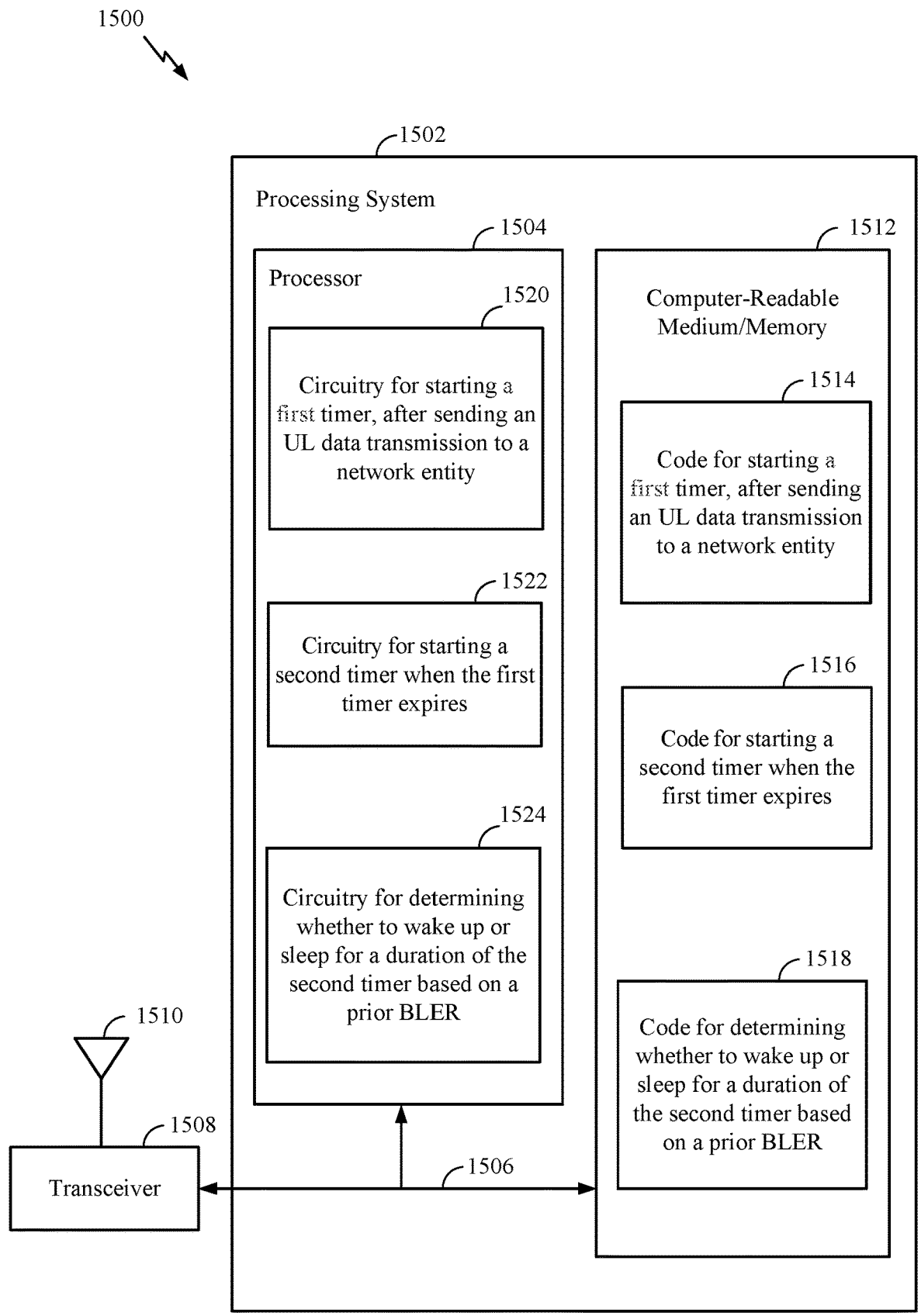
FIG. 15 illustrates a communications device that may include various components configured to perform operations for the techniques disclosed herein, in accordance with certain aspects of the present disclosure.

FIG. 15 illustrates a communications device 1500 that may include various components (e.g., corresponding to means-plus-function components) configured to perform operations for the techniques disclosed herein, such as the operations illustrated in FIG. 5. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 is configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/ memory 1512 is configured to store instructions (e.g., a computer-executable code) that when executed by the processor 1504, cause the processor 1504 to perform the operations illustrated in FIG. 5, or other operations for performing the various techniques discussed herein. In certain aspects, computer-readable medium/memory 1512 stores code 1514 for starting, code 1516 for starting, and code 1518 for determining. The code 1514 for starting may include code for starting a first timer, after sending an uplink (UL) data transmission to a network entity. The code 1516 for starting may include code for starting a second timer when the first timer expires. The code 1518 for determining may include code for determining whether to wake up or sleep for a duration of the second timer based on a prior block error rate (BLER).

The processor 1504 may include circuitry configured to implement the code stored in the computer-readable medium/memory 1512, such as for performing the operations illustrated in FIG. 5, as well as other operations for performing the various techniques discussed herein. For example, the processor 1504 includes circuitry 1520 for starting, circuitry 1522 for starting, and circuitry 1524 for determining. The circuitry 1520 for starting may include circuitry for starting a first timer, after sending an UL data transmission to a network entity. The circuitry 1522 for starting may include circuitry for starting a second timer when the first timer expires. The circuitry 1524 for determining may include circuitry for determining whether to wake up or sleep for a duration of the second timer based on a prior BLER.

Figure 16:
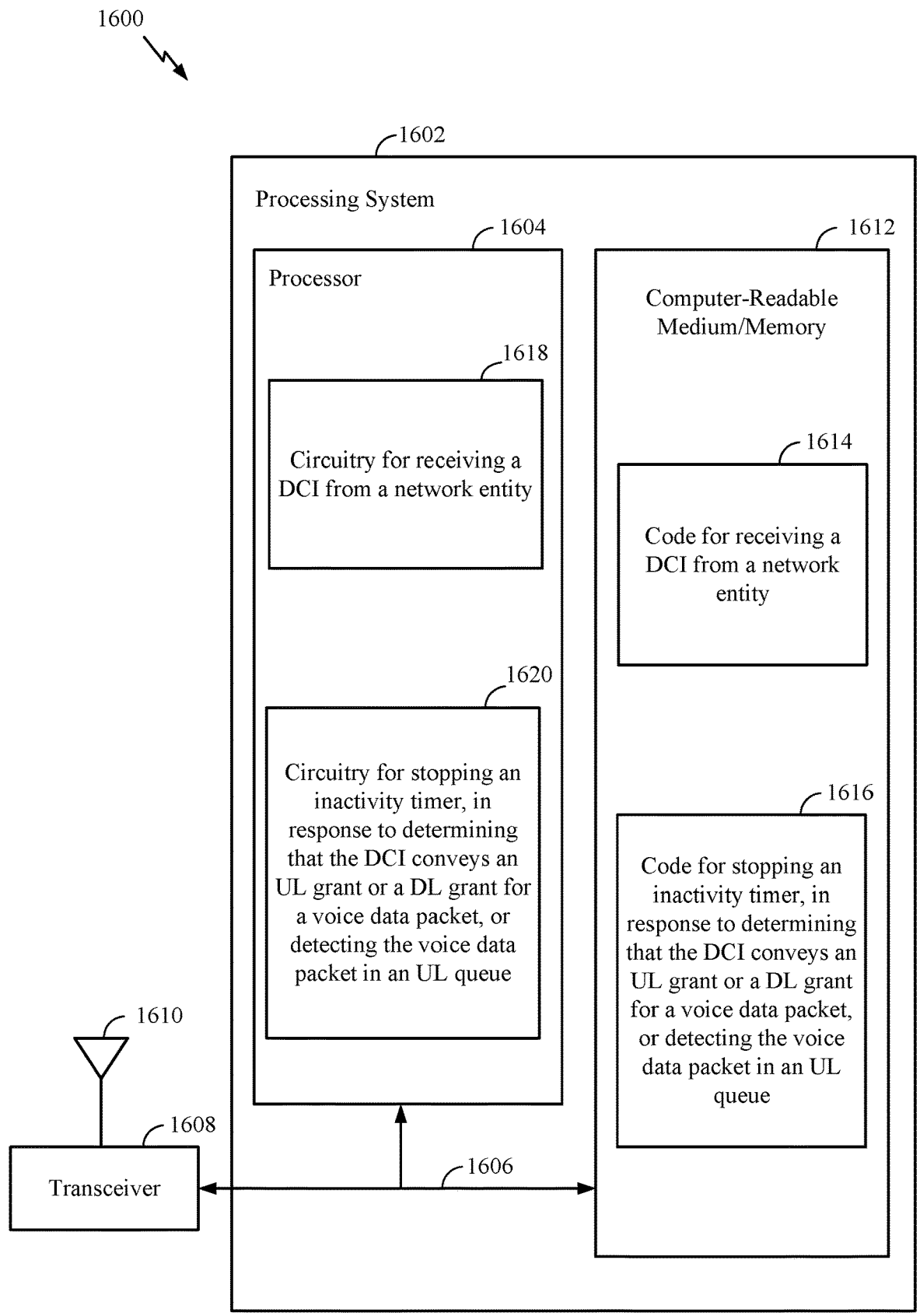
FIG. 16 illustrates a communications device that may include various components configured to perform operations for the techniques disclosed herein, in accordance with certain aspects of the present disclosure.

FIG. 16 illustrates a communications device 1600 that may include various components (e.g., corresponding to means-plus-function components) configured to perform operations for the techniques disclosed herein, such as the operations illustrated in FIG. 11. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 is configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/ memory 1612 is configured to store instructions (e.g., a computer-executable code) that when executed by the processor 1604, cause the processor 1604 to perform the operations illustrated in FIG. 11, or other operations for performing the various techniques discussed herein. In certain aspects, computer-readable medium/memory 1612 stores code 1614 for receiving and code 1616 for stopping. The code 1614 for starting may include code for receiving a downlink control information (DCI) from a network entity. The code 1616 for stopping may include code for stopping an inactivity timer, in response to determining that the DCI conveys an UL grant or a downlink (DL) grant for a voice data packet, or detecting the voice data packet in an UL queue.

The processor 1604 may include circuitry configured to implement the code stored in the computer-readable medium/memory 1612, such as for performing the operations illustrated in FIG. 11, as well as other operations for performing the various techniques discussed herein. For example, the processor 1604 includes circuitry 1618 for receiving and circuitry 1620 for stopping. The circuitry 1618 for receiving may include circuitry for receiving a DCI from a network entity. The circuitry 1620 for stopping may include circuitry for stopping an inactivity timer, in response to determining that the DCI conveys an UL grant or a DL grant for a voice data packet, or detecting the voice data packet in an UL queue.

Figure 17:
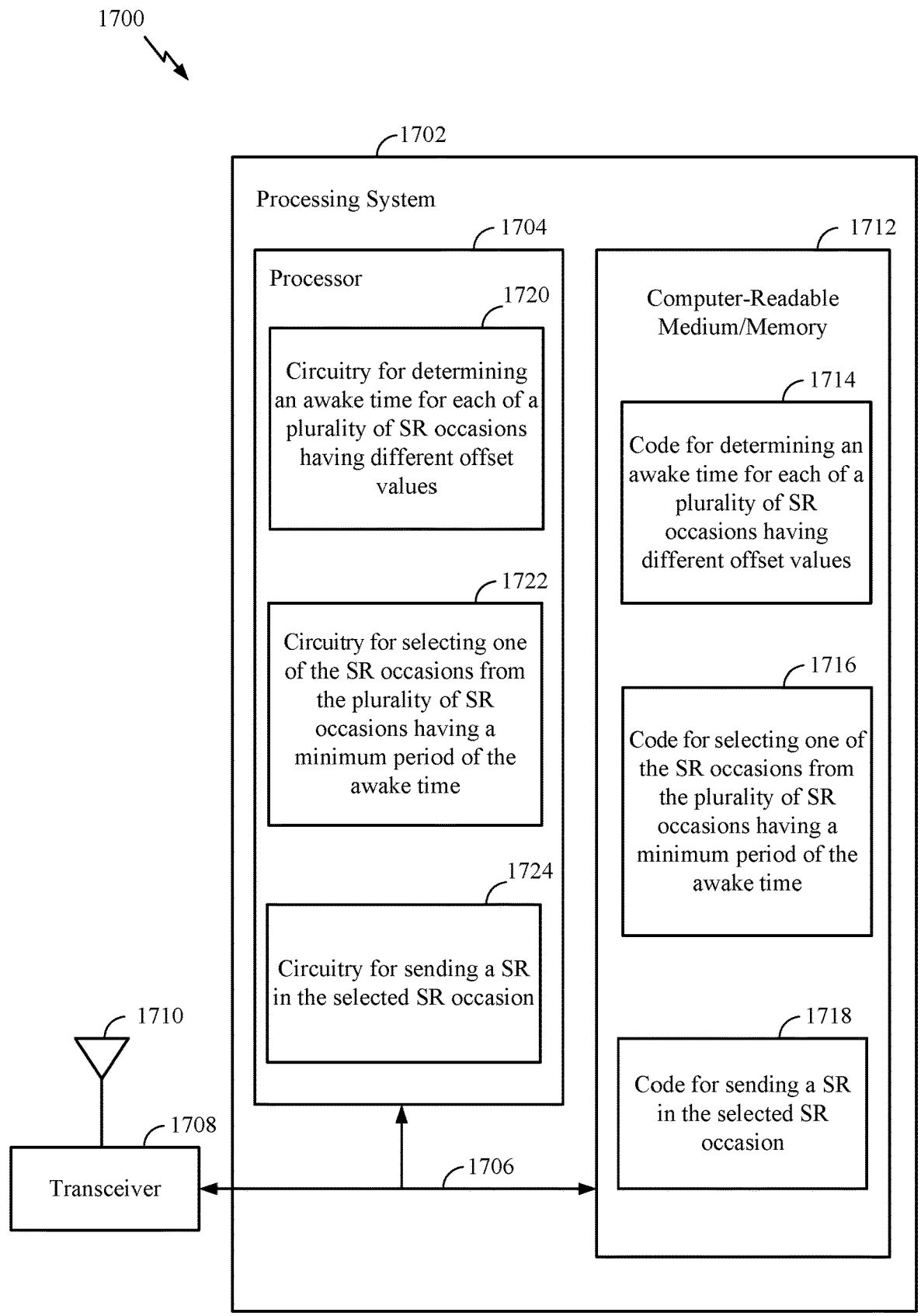
FIG. 17 illustrates a communications device that may include various components configured to perform operations for the techniques disclosed herein, in accordance with certain aspects of the present disclosure.

FIG. 17 illustrates a communications device 1700 that may include various components (e.g., corresponding to means-plus-function components) configured to perform operations for the techniques disclosed herein, such as the operations illustrated in FIG. 13. The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 is configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/ memory 1712 is configured to store instructions (e.g., a computer-executable code) that when executed by the processor 1704, cause the processor 1704 to perform the operations illustrated in FIG. 13, or other operations for performing the various techniques discussed herein. In certain aspects, computer-readable medium/memory 1712 stores code 1714 for determining, code 1716 for selecting, and code 1718 for sending. The code 1714 for determining may include code for determining an awake time for each of a plurality of scheduling request (SR) occasions having different offset values. The code 1716 for selecting may include code for selecting one of the SR occasions from the plurality of SRs occasions having a minimum period of the awake time. The code 1718 for sending may include code for sending an SR in the selected SR occasion.

The processor 1704 may include circuitry configured to implement the code stored in the computer-readable medium/memory 1712, such as for performing the operations illustrated in FIG. 13, as well as other operations for performing the various techniques discussed herein. For example, the processor 1704 includes circuitry 1720 for determining, circuitry 1722 for selecting, and circuitry 1724 for sending. The circuitry 1720 for determining may include circuitry for determining an awake time for each of a plurality of scheduling request (SR) occasions having different offset values. The circuitry 1722 for selecting may include circuitry for selecting one of the SR occasions from the plurality of SRs occasions having a minimum period of the awake time. The circuitry 1724 for sending may include circuitry for sending an SR in the selected SR occasion.

Example Aspects

Implementation examples are described in the following numbered aspects.

In a first aspect, a method for wireless communications by a user equipment (UE), comprising: starting a first timer, after sending an uplink (UL) data transmission to a network entity; starting a second timer when the first timer expires; and determining whether to wake up or sleep for a duration of the second timer based on a prior block error rate (BLER).

In a second aspect, alone or in combination with the first aspect, the first timer corresponds to a discontinuous reception (DRX) hybrid automatic repeat request (HARQ) round-trip-time (RTT) timer and the second timer corresponds to a DRX retransmission timer.

In a third aspect, alone or in combination with one or more of the first and second aspects, the UE skips receiving a hybrid automatic repeat request (HARQ) retransmission from the network entity for the duration of the second timer, when the UE determines to sleep for the duration of the second timer based on the prior BLER.

In a fourth aspect, alone or in combination with one or more of the first through third aspects, the UE is configured to wake up for a first number of discontinuous reception (DRX) cycles to measure the BLER after each UL data transmission for the first number of DRX cycles.

In a fifth aspect, alone or in combination with one or more of the first through fourth aspects, the UE is configured to not wake up to receive a hybrid automatic repeat request (HARQ) retransmission for a second number of DRX cycles after any UL data transmission for the second number of DRX cycles.

In a sixth aspect, alone or in combination with one or more of the first through fifth aspects, the UE determines to stay awake for the duration of the second timer in the second number of DRX cycles, after Nth hybrid automatic repeat request (HARQ) retransmission, when the prior BLER on the Nth HARQ retransmission is more than or equal to a threshold.

In a seventh aspect, alone or in combination with one or more of the first through sixth aspects, the first number of DRX cycles during which the UE measures the BLER is followed after the second number of DRX cycles during which the UE does not wake up, if the measured BLER after Nth UL data transmission is less than a threshold.

In an eighth aspect, alone or in combination with one or more of the first through seventh aspects, detecting a packet to be a voice data packet or a non-voice data packet in an UL buffer or a downlink (DL) transmission based on a logical channel BD (LCID) of unacknowledged mode (UM) bearer in IP multimedia subsystem (IMS) protocol data unit (PDU) session; starting a disable timer, in response to detecting the non-voice data packet, wherein the UE is configured to be awake to receive a hybrid automatic repeat request (HARQ) retransmission for the duration of the second timer when the disable timer starts; and stopping the disable timer when the non-voice data packet disappears for at least a predetermined period.

In a ninth aspect, alone or in combination with one or more of the first through eighth aspects, starting a disable timer for a predetermined period, in response to determining at least one of: an allocation of a physical uplink shared channel (PUSCH) modulation coding scheme (MCS) has reduced beyond a threshold when a path loss of the UE has not changed; no toggling of a new data indicator (NDI) in an ON duration of a discontinuous reception (DRX) cycle; the toggling of the NDI in the ON duration of the DRX cycle and a downlink control information (DCI) providing a reserved modulation coding scheme (MCS); a receipt of a real time transport protocol (RTP) control protocol (RTCP) feedback indicating a packet loss; and the receipt of a robust header compression (ROHC) feedback indicating the packet loss, and stopping the disable timer, after the predetermined period, when all BLERs are less than a threshold.

In a tenth aspect, alone or in combination with one or more of the first through ninth aspects, the UE determines to sleep for the duration of the second timer, based on the prior BLER, only when a duration of the second timer is more than or equal to a predetermined time period.

In an eleventh aspect, alone or in combination with one or more of the first through tenth aspects, the UE determines to wake up for a first duration during the duration of the second timer, based on a prior measurement of a hybrid automatic repeat request (HARQ) retransmission delay, and wherein a value of the first duration is less than a value of the second timer configured by the network entity.

In a twelfth aspect, a method for wireless communications by a user equipment (UE), comprising: receiving a downlink control information (DCI) from a network entity; and stopping an inactivity timer, in response to determining that the DCI conveys an uplink (UL) grant or a downlink (DL) grant for a voice data packet, or detecting the voice data packet in an UL queue.

In a thirteenth aspect, alone or in combination with the twelfth aspect, starting a disable timer, in response to detecting the UL grant or the DL grant containing a non-voice data packet, or the non-voice data packet in the UL queue, wherein the UE is configured to be awake for a duration of the inactivity timer when the disable timer starts.

In a fourteenth aspect, alone or in combination with one or more of the twelfth and thirteenth aspects, starting a disable timer for a current discontinuous reception (DRX) cycle when an UL buffer status report (BSR) is indicated in an UL transport block (TB), wherein the UE is configured to be awake for a duration of the inactivity timer when the disable timer starts.

In a fifteenth aspect, alone or in combination with one or more of the twelfth to fourteenth aspects, the UE detects the voice data packet in the DL and the UL based on a logical channel ID (LCID) of unacknowledged mode (UM) bearer in IP multimedia subsystem (IMS) protocol data unit (PDU) session.

In a sixteenth aspect, a method for wireless communications by a user equipment (UE), comprising: determining an awake time for each of a plurality of scheduling request (SR) occasions having different offset values; selecting one of the SR occasions from the plurality of SRs occasions having a minimum period of the awake time; and sending a SR in the selected SR occasion.

In a seventeenth aspect, alone or in combination with the sixteenth aspect, the plurality of SR occasions comprises a first SR occasion having a first offset value occurring before a discontinuous reception (DRX) cycle and a second SR occasion having a second offset value occurring within a discontinuous reception (DRX) cycle.

In an eighteenth aspect, alone or in combination with one or more of the sixteenth and seventeenth aspects, the awake time for the first SR occasion is a maximum of a first value and a second value, and wherein: the first value comprises a sum of the first offset value and an ON duration of the DRX cycle, and the second value comprises the sum of a duration between the first SR occasion and a receipt of a grant of a downlink control information (DCI), the duration for receiving the DCI, and the duration of an inactivity timer started after receiving the DCI.

In a nineteenth aspect, alone or in combination with one or more of the sixteenth through eighteenth aspects, the awake time for the second SR occasion is a maximum of a third value and a fourth value, and wherein: the third value comprises the ON duration of the DRX cycle, and the fourth value comprises a sum of the second offset value, a duration between the second SR occasion and the receipt of the grant of the DCI, the duration for receiving the DCI, and the duration of the inactivity timer started after receiving the DCI.

In a twentieth aspect, alone or in combination with one or more of the sixteenth through nineteenth aspects, the UE selects the first SR occasion from the plurality of SR occasions comprising the first SR occasion and the second SR occasion only when a maximum of the first value and second value is less than the maximum of the third value and the fourth value.

In a twenty-first aspect, alone or in combination with one or more of the sixteenth through twentieth aspects, determining the duration between the first SR occasion and the receipt of the grant of the DCI, and the duration between the second SR occasion and the receipt of the grant of the DCI, based on at least one past SR occasion.

An apparatus for wireless communication, comprising at least one processor; and a memory coupled to the at least one processor, the memory comprising code executable by the at least one processor to cause the apparatus to perform the method of any of the first through twenty-first aspects.

An apparatus comprising means for performing the method of any of the first through twenty-first aspects.

A computer readable medium storing computer executable code thereon for wireless communications that, when executed by at least one processor, cause an apparatus to perform the method of any of the first through twenty-first aspects.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, allocating, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (UE) 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5, 11, and 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
   starting a first timer, after sending an uplink (UL) data transmission to a network entity;
   starting a second timer when the first timer expires;
   starting a disable timer, in response to detecting a non-voice data packet in an UL buffer or a downlink (DL) transmission;
   stopping the disable timer when the non-voice data packet disappears for at least a predetermined period; and determining whether to wake up or sleep for a duration of the second timer based on a prior block error rate (BLER), wherein the UE is configured to be awake for the duration of the second timer when the disable timer starts.

2. The method of claim 1, wherein the first timer corresponds to a discontinuous reception (DRX) hybrid automatic repeat request (HARQ) round-trip-time (RTT) timer and the second timer corresponds to a DRX retransmission timer.

3. The method of claim 1, wherein the UE skips receiving a hybrid automatic repeat request (HARQ) retransmission from the network entity for the duration of the second timer, when the UE determines to sleep for the duration of the second timer based on the prior BLER.

4. The method of claim 1, wherein the UE is configured to wake up for a first number of discontinuous reception (DRX) cycles to measure the BLER after each UL data transmission for the first number of DRX cycles.

5. The method of claim 4, wherein the UE is configured to not wake up to receive a hybrid automatic repeat request (HARQ) retransmission for a second number of DRX cycles after any UL data transmission for the second number of DRX cycles.

6. The method of claim 5, wherein the UE determines to stay awake for the duration of the second timer in the second number of DRX cycles, after Nth hybrid automatic repeat request (HARQ) retransmission, when the prior BLER on the Nth HARQ retransmission is more than or equal to a threshold.

7. The method of claim 5, wherein the first number of DRX cycles during which the UE measures the BLER is followed after the second number of DRX cycles during which the UE does not wake up, if the measured BLER after Nth UL data transmission is less than a threshold.

8. The method of claim 1, wherein
detecting the non-voice data packet in the UL buffer or the downlink (DL) transmission is based on a logical channel ID (LCID) of an unacknowledged mode (UM) bearer in an IP multimedia subsystem (IMS) protocol data unit (PDU) session, and wherein,
the UE is configured to be awake to receive a hybrid automatic repeat request (HARQ) retransmission for the duration of the second timer when the disable timer starts.

9. The method of claim 1, wherein
starting the disable timer is further in response to determining at least one of:
an allocation of a physical uplink shared channel (PUSCH) modulation coding scheme (MCS) has reduced beyond a threshold when a path loss of the UE has not changed;
no toggling of a new data indicator (NDI) in an ON duration of a discontinuous reception (DRX) cycle;
the toggling of the NDI in the ON duration of the DRX cycle and a downlink control information (DCI) providing a reserved modulation coding scheme (MCS);
a receipt of a real time transport protocol (RTP) control protocol (RTCP) feedback indicating a packet loss; and
the receipt of a robust header compression (ROHC) feedback indicating the packet loss, and
wherein stopping the disable timer, after the predetermined period, occurs when all BLERs are less than a threshold.

10. The method of claim 1, wherein the UE determines to sleep for the duration of the second timer, based on the prior BLER, only when a duration of the second timer is more than or equal to a predetermined time period.

11. The method of claim 1, wherein the UE determines to wake up for a first duration during the duration of the second timer, based on a prior measurement of a hybrid automatic repeat request (HARQ) retransmission delay, and wherein a value of the first duration is less than a value of the second timer configured by the network entity.

12. An apparatus for wireless communications by a user equipment (UE), comprising:
at least one processor and a memory configured to:
start a first timer, after sending an uplink (UL) data transmission to a network entity;
start a second timer when the first timer expires;
start a disable timer, in response to detecting a non-voice data packet in an UL buffer or a downlink (DL) transmission;
stop the disable timer when the non-voice data packet disappears for at least a predetermined period; and
determine whether to wake up or sleep for a duration of the second timer based on a prior block error rate (BLER), wherein the UE is configured to be awake for the duration of the second timer when the disable timer starts.

13. The apparatus of claim 12, wherein the first timer corresponds to a discontinuous reception (DRX) hybrid automatic repeat request (HARQ) round-trip-time (RTT) timer and the second timer corresponds to a DRX retransmission timer.

14. The apparatus of claim 12, wherein the UE skips receiving a hybrid automatic repeat request (HARQ) retransmission from the network entity for the duration of the second timer, when the UE determines to sleep for the duration of the second timer based on the prior BLER.

15. The apparatus of claim 12, wherein the UE is configured to wake up for a first number of discontinuous reception (DRX) cycles to measure the BLER after each UL data transmission for the first number of DRX cycles.

16. The apparatus of claim 15, wherein the UE is configured to not wake up for a second number of DRX cycles after any UL data transmission for the second number of DRX cycles.

17. The apparatus of claim 16, wherein the UE determines to stay awake for the duration of the second timer in the second number of DRX cycles, after Nth hybrid automatic repeat request (HARQ) retransmission, when the prior BLER on the Nth HARQ retransmission is more than or equal to a threshold.

18. The apparatus of claim 16, wherein the first number of DRX cycles during which the UE measures the BLER is followed after the second number of DRX cycles during which the UE does not wake up, if the measured BLER after Nth UL data transmission is less than a threshold.

19. The apparatus of claim 12, wherein
starting the disable timer is further in response to determining at least one of:
an allocation of a physical uplink shared channel (PUSCH) modulation coding scheme (MCS) has reduced beyond a threshold when a path loss of the UE has not changed;
no toggling of a new data indicator (NDI) in an ON duration of a discontinuous reception (DRX) cycle;
the toggling of the NDI in the ON duration of the DRX cycle and a downlink control information (DCI) providing a reserved modulation coding scheme (MCS);

a receipt of a real time transport protocol (RTP) control protocol (RTCP) feedback indicating a packet loss; and the receipt of a robust header compression (ROHC) feedback indicating the packet loss, and wherein stopping the disable timer, after the predetermined period, occurs when all BLERs are less than a threshold.

20. An apparatus for wireless communications at a user equipment (UE), comprising:

means for starting a first timer, after sending an uplink (UL) data transmission to a network entity;

means for starting a second timer when the first timer expires;

means for starting a disable timer, in response to detecting a non-voice data packet in an UL buffer or a downlink (DL) transmission;

means for stopping the disable timer when the non-voice data packet disappears for at least a predetermined period; and means for determining whether to wake up or sleep for a duration of the second timer based on a prior block error rate (BLER), wherein the UE is configured to be awake for the duration of the second timer when the disable timer starts.

21. The apparatus of claim 20, wherein the first timer corresponds to a discontinuous reception (DRX) hybrid automatic repeat request (HARQ) round-trip-time (RTT) timer and the second timer corresponds to a DRX retransmission timer.

22. The apparatus of claim 20, further comprising:

means for skipping receiving a hybrid automatic repeat request (HARQ) retransmission from the network entity for the duration of the second timer, when the UE determines to sleep for the duration of the second timer based on the prior BLER.

23. The apparatus of claim 20, further comprising:

means for waking up for a first number of discontinuous reception (DRX) cycles to measure the BLER after each UL data transmission for the first number of DRX cycles.

24. The apparatus of claim 23, further comprising:

means for not waking up to receive a hybrid automatic repeat request (HARQ) retransmission for a second number of DRX cycles after any UL data transmission for the second number of DRX cycles.

25. The apparatus of claim 24, further comprising:

means for determining to stay awake for the duration of the second timer in the second number of DRX cycles, after an Nth hybrid automatic repeat request (HARQ) retransmission, when the prior BLER on the Nth HARQ retransmission is more than or equal to a threshold.

26. The apparatus of claim 24, wherein the first number of DRX cycles during which the UE measures the BLER is followed after the second number of DRX cycles during which the UE does not wake up, if the measured BLER after an Nth UL data transmission is less than a threshold.

27. The apparatus of claim 20, wherein the means for detecting the non-voice data packet in the UL buffer or the downlink (DL) transmission detects the non-voice data packet based on a logical channel ID (LCID) of an unacknowledged mode (UM) bearer in an IP multimedia subsystem (IMS) protocol data unit (PDU) session, and wherein the apparatus further comprises means for configuring the UE, to be awake to receive a hybrid automatic repeat request (HARD) retransmission for the duration of the second timer when the disable timer starts.

28. The apparatus of claim 20, wherein the means for starting the disable timer starts the disable timer further in response to determining at least one of:

an allocation of a physical uplink shared channel (PUSCH) modulation coding scheme (MCS) has reduced beyond a threshold when a path loss of the UE has not changed;

no toggling of a new data indicator (NDI) in an ON duration of a discontinuous reception (DRX) cycle;

the toggling of the NDI in the ON duration of the DRX cycle and a downlink control information (DCI) providing a reserved modulation coding scheme (MCS);

a receipt of a real time transport protocol (RTP) control protocol (RTCP) feedback indicating a packet loss; and the receipt of a robust header compression (ROHC) feedback indicating the packet loss, and wherein the means for stopping the disable timer stops the disable timer after the predetermined period when all BLERs are less than a threshold.

29. A non-transitory computer-readable medium having program code recorded thereon, the program code comprising:

code for causing a user equipment (UE) to start a first timer, after sending an uplink (UL) data transmission to a network entity;

code for causing the UE to start a second timer when the first timer expires;

code for causing the UE to start a disable timer, in response to detecting a non-voice data packet in an UL buffer or a downlink (DL) transmission;

code for causing the UE to stop the disable timer when the non-voice data packet disappears for at least a predetermined period; and code for causing the UE to determine whether to wake up or sleep for a duration of the second timer based on a prior block error rate (BLER), wherein the UE is configured to be awake for the duration of the second timer when the disable timer starts.

* * * * *